United States Patent
Davis et al.

(10) Patent No.: US 9,336,332 B2
(45) Date of Patent: May 10, 2016

(54) PROGRAMMATIC DATA DISCOVERY PLATFORMS FOR COMPUTING APPLICATIONS

(71) Applicant: ClipCard Inc., Seattle, WA (US)

(72) Inventors: Don W. Davis, Bainbridge Island, WA (US); Michael P. Gerlek, Eagle, ID (US); Ryan Cunningham, Seattle, WA (US)

(73) Assignee: CLIPCARD INC., Seattle, WA (US)

( * ) Notice: Subject to any disclaimer, the term of this patent is extended or adjusted under 35 U.S.C. 154(b) by 197 days.

(21) Appl. No.: 14/151,777

(22) Filed: Jan. 9, 2014

(65) Prior Publication Data
US 2015/0066896 A1    Mar. 5, 2015

Related U.S. Application Data

(60) Provisional application No. 61/871,256, filed on Aug. 28, 2013.

(51) Int. Cl.
G06F 7/00    (2006.01)
G06F 17/30   (2006.01)

(52) U.S. Cl.
CPC ............................... *G06F 17/30991* (2013.01)

(58) Field of Classification Search
None
See application file for complete search history.

(56) References Cited

U.S. PATENT DOCUMENTS

| | | | |
|---|---|---|---|
| 5,379,419 A | 1/1995 | Heffernan et al. |
| 5,481,718 A | 1/1996 | Ryu et al. |
| 5,493,677 A | 2/1996 | Balogh et al. |
| 5,497,491 A | 3/1996 | Mitchell et al. |
| 5,504,858 A | 4/1996 | Ellis et al. |
| 5,550,965 A | 8/1996 | Gabbe et al. |
| 5,579,516 A | 11/1996 | Van Maren et al. |
| 5,619,710 A | 4/1997 | Travis et al. |
| 5,640,555 A | 6/1997 | Kleewein et al. |
| 5,682,535 A | 10/1997 | Knudsen |
| 5,692,175 A | 11/1997 | Davies et al. |
| 5,721,903 A | 2/1998 | Anand et al. |
| 5,724,501 A | 3/1998 | Dewey et al. |
| 5,761,678 A | 6/1998 | Bendert et al. |
| 5,768,577 A | 6/1998 | Kleewein et al. |
| 5,774,643 A | 6/1998 | Lubbers et al. |
| 5,787,412 A | 7/1998 | Bosch et al. |
| 5,787,413 A | 7/1998 | Kauffman et al. |
| 5,826,001 A | 10/1998 | Lubbers et al. |
| 5,848,273 A | 12/1998 | Fontana et al. |

(Continued)

OTHER PUBLICATIONS

IBM InfoSphere Data Explorer. IBM Software. 2013.

(Continued)

*Primary Examiner* — Kimberly Wilson

(74) *Attorney, Agent, or Firm* — Wilson Sonsini Goodrich & Rosati

(57) ABSTRACT

Systems, methods and techniques for discovering, managing and/or representing data are described. In particular, systems and methods for acquiring, representing, and disseminating data independently of, for example, the nature of the data sources or the data storage infrastructure, are described. Such discovery, management and/or representation may be enabled by various manners of integration into pre-existing network architecture, enabled via system(s) or method(s) implemented remotely from pre-existing network architecture, and/or enabled via programmatic integration into existing computing applications such as Web applications.

26 Claims, 21 Drawing Sheets

(56) References Cited

U.S. PATENT DOCUMENTS

| | | | |
|---|---|---|---|
| 5,862,325 A | 1/1999 | Reed et al. | |
| 5,870,746 A | 2/1999 | Knutson et al. | |
| 5,874,955 A | 2/1999 | Rogowitz et al. | |
| 5,890,167 A | 3/1999 | Bridge et al. | |
| 6,233,575 B1 | 5/2001 | Agrawal et al. | |
| 7,251,693 B2 | 7/2007 | Stull et al. | |
| 7,743,009 B2 | 6/2010 | Hangartner et al. | |
| 8,229,948 B1 | 7/2012 | Ershov | |
| 8,458,171 B2 | 6/2013 | Wu et al. | |
| 2002/0133504 A1 | 9/2002 | Vlahos et al. | |
| 2005/0108001 A1 | 5/2005 | Aarskog | |
| 2005/0216472 A1 | 9/2005 | Leon et al. | |
| 2006/0004704 A1 | 1/2006 | Gross | |
| 2007/0118873 A1* | 5/2007 | Houh et al. | 725/136 |
| 2008/0215747 A1 | 9/2008 | Menon et al. | |
| 2008/0256482 A1 | 10/2008 | Lee et al. | |
| 2009/0006383 A1 | 1/2009 | Tunkelang et al. | |
| 2009/0099999 A1* | 4/2009 | Warren | 707/1 |
| 2009/0106234 A1 | 4/2009 | Siedlecki et al. | |
| 2009/0112812 A1 | 4/2009 | Ellis et al. | |
| 2009/0267946 A1 | 10/2009 | Agutter et al. | |
| 2010/0070448 A1 | 3/2010 | Omoigui | |
| 2010/0211564 A1* | 8/2010 | Cohen et al. | 707/722 |
| 2011/0218821 A1* | 9/2011 | Walton et al. | 705/3 |
| 2012/0011167 A1* | 1/2012 | Schmidt | 707/802 |
| 2012/0137367 A1 | 5/2012 | Dupont et al. | |
| 2012/0191716 A1 | 7/2012 | Omoigui | |
| 2012/0213416 A1 | 8/2012 | Lorimer et al. | |
| 2012/0265780 A1 | 10/2012 | Gerard et al. | |
| 2013/0117692 A1 | 5/2013 | Padmanabhan et al. | |
| 2013/0124552 A1* | 5/2013 | Stevenson et al. | 707/759 |
| 2013/0136253 A1 | 5/2013 | Liberman Ben-Ami et al. | |
| 2013/0191749 A1 | 7/2013 | Coburn et al. | |
| 2013/0238387 A1* | 9/2013 | Stibel et al. | 705/7.28 |
| 2014/0129942 A1* | 5/2014 | Rathod | H04N 21/44222 715/720 |
| 2014/0181130 A1 | 6/2014 | Davis et al. | |

OTHER PUBLICATIONS

Palamara. Overview of InfoSphere Data Explorer: Discovering & Exploring Big Data. InformationOnDemand, Mandalay Bay, Las Vegas. Session No. IBD-2541. IBM Software. Nov. 3-7, 2013.
U.S. Appl. No. 14/151,759, filed Jan. 9, 2014, Davis et al.
U.S. Appl. No. 14/151,760, filed Jan. 9, 2014, Davis et al.
U.S. Appl. No. 14/151,770, filed Jan. 9, 2014, Davis et al.
U.S. Appl. No. 14/151,772, filed Jan. 9, 2014, Davis et al.
U.S. Appl. No. 14/317,774, filed Jun. 27, 2014, Davis et al.
IEEE 100 the Authoritative Dictionary of IEEE Standards Terms, 7th Edition, 2000, p. 410.
International search report and written opinion dated Jan. 16, 2014 for PCT/US2013/075811.
Zeb, 3 Incredible Benefits of Using APis, Feb. 6, 2012, pp. 1-2.

* cited by examiner

PROGRAMMATIC DATA DISCOVERY PLATFORMS FOR COMPUTING APPLICATIONS

CROSS-REFERENCE

This application claims the benefit of U.S. Provisional Application No. 61/871,256, filed Aug. 28, 2013, which application is incorporated herein by reference.

This application is related to the following copending patent applications: U.S. application Ser. No. 14/151,760; U.S. application Ser. No. 14/151,772; U.S. application Ser. No. 14/151,759; and U.S. application Ser. No. 14/151,770; which applications are incorporated herein by reference to the same extent as if each individual application was specifically and individually indicated to be incorporated by reference.

BACKGROUND

As human knowledge increases in scope and complexity, the amount of information generated therefrom grows at an astounding rate. The proportion of information-generating devices and methodologies continues to increase, as does the general connectivity of such devices and methodologies. As a result, the amount and complexity of data representing a given concept also tends to increase over time, thus accelerating the overall growth in the size and complexity of data sets across diverse applications. However, the ability to process "big data," as such ponderously large and complex data sets are commonly known, is often limited by both time and computing resource constraints. Furthermore, "big data" also encompasses collections of data sets in which the individual data assets may not be overwhelmingly large or complex, but the total volume, velocity, variety, etc. of incoming data limit the ability of user entities to derive meaningful information from such data. These collective limitations constitute the fundamental problem underlying big data.

Methodologies for mitigating such constraints are in continuous development. For example, network-connected distributed computing systems, known as cloud computing systems, provide scalable, massively parallelized and aggregated compute resources, such as databases, disk storage, processing capability, and the like. Cloud computing systems provide access to considerably greater computing resources than they might otherwise be able to privately procure and/or administer, thus providing for the use, storage and manipulation of big data associated therewith to a far greater population of users with limited local resources.

However, cloud computing is, by its nature, a "brute force" solution for dealing with the sheer scale of big data. Other logistical issues, such as the length of time involved in getting the data into and out of a cloud computing system in the first instance, as well as the abilities of enterprises, human entities, and the like to quickly efficiently determine or ascertain the contents of big data, generally remain, and become increasingly important as emerging technologies and collaboration models enable greater numbers of, e.g., non-institutional users to participate in the creation, management and dissemination of the concepts underlying the data (as well as the data itself). Additionally, as the scope of information generation grows broader over time, the number of disparate data formats and types between data sets, and at times within a given data set, increases.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying exhibits of which:

DETAILED DESCRIPTION

Figure 1:
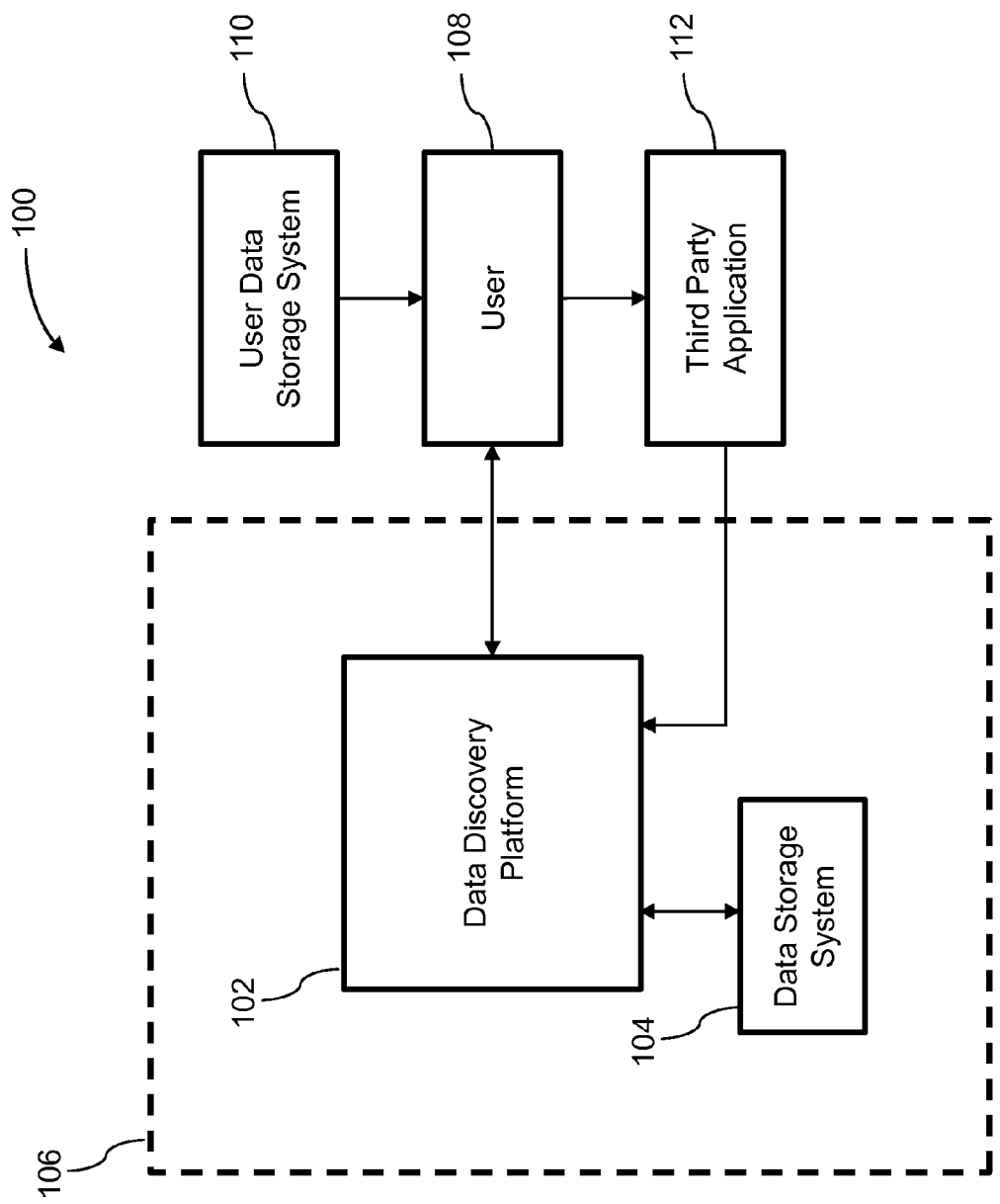
FIG. 1 shows an illustrative example of an environment in which a data discovery platform may be implemented in accordance with at least one embodiment.

Techniques described, suggested and implied herein include systems and methods for storing, accessing, sharing and/or otherwise managing information using representative abstracts of that information. In some embodiments, a "data discovery platform" is implemented to provide a unified entity for indexing, summarizing, navigating, discovering, and/or disseminating data originating from a plurality of heterogeneous data sources. The term "data discovery platform" may also be used interchangeably herein with the term "data management system," and may include multiple components, some of which are described in further detail herein. Examples of such components include summary and navigation layers, abstraction layers, abstraction systems, and central abstract repositories. The data discovery platforms described herein may provide various facilities for improving the comprehensibility of information originating from a plurality of disparate data sources, such as information associated with big data. For example, such data discovery platforms may provide visually representable abstractions of big data in order to allow users to more rapidly grasp the key concepts and information encompassed by such data. Additionally, the disclosed data discovery platforms may provide a unified entity within an existing system architecture for the management of heterogeneous data assets, such as for the purposes of data organization, indexing, searching, dissemination, and the like. Furthermore, some embodiments of the data discovery platforms described herein may assist users in discovering and connecting to data sources of interest, as well as relevant data-associated entities (e.g., data creators, data owners, experts, other users with similar interests, etc.) associated with such data sources, thereby facilitating the process of information discovery, data sharing, and decision making.

The data operated upon by a data discovery platform may include streaming and/or real-time data, static or dynamic data, structured or unstructured data, data files, collections of data files, data sets, and the like, and any of the foregoing may derive from any appropriate data source or asset. Examples of such data sources include databases, web services, applications, data stores or storage systems such as virtualized or "cloud" storage systems or physical hard disk drives, live data feeds, data streams, data collecting and/or data generating devices such as sensor platforms (such as unmanned vehicles (e.g., unmanned aerial vehicles), weather observation platforms, buoys, underwater platforms, robotic manufacturing devices, wind turbines, oil or gas wellheads, motion sensors, and the like), knowledge management systems, directories, social media, and the like. The data operated on may in some embodiments be generated automatically by the asset(s). In some embodiments, the data operated on may relate to (or be derived from) one or more functional outputs, parameters or characteristics of the data source(s) or asset(s). In some embodiments, the data may be derived or sourced from any Internet-facing or Internet-visible source (e.g., a Web-enabled endpoint), some examples of which are provided herein.

The data discovery platform described herein may implement any suitable strategy for abstracting and/or summarizing the data in order to provide an efficient, compact representation of the information encompassed by the data. For example, a data discovery platform may employ metadata extraction, analysis, indexing, and/or data modeling schemes, to complex, heterogeneous, and/or very large data files (or sets or supersets of data files), so as to ease the handling, processing, and dissemination of the data. It is contemplated that such extraction and/or modeling schemes may be applied to any data type, asset, size, or source, as well as abstractions thereof (such as metadata). The representations produced by the data discovery platforms may also be referred to herein as "abstracts," "data abstracts," "data summaries," "information abstracts," "information summaries," and the like. Abstracts may incorporate and/or be based on ancillary data derived from the source data, with the ancillary data including information representative of the content, structure, context, associations, or any other relevant characteristics of the source data. For example, the abstracts may be based on metadata extracted, associated, generated, or otherwise derived from the source data. The term "metadata," as used herein, may refer to any data or content derived or derivable from other data or content, including both structural metadata and descriptive metadata. Examples include data or content regarding the manner of creation, intended purpose, origin, location (in any sense, including relative, absolute, topological, virtual or geographical), associations with other data assets, structure of other data or content, and/or interoperability of the data with extrinsic applications. Such metadata may be, in some instances, compliant with a predetermined metadata format or standard. The abstracts generated by the data discovery platform may also be based on metrics, analytics, summaries, indices, identifiers, and/or models derived from the source data, for instance, using the data extraction, analysis, indexing, and/or modeling schemes described herein. Any description herein relating to metadata may also be applied to any ancillary data derived from source data.

The ancillary data sets useable for generating abstracts may be derived from the source data by the data discovery platform. Alternatively or in addition, some or all of these ancillary data sets may be derived from the source data by another entity and subsequently provided to the data discovery platform. Such entities may include, for example, a "data provider," which may refer to any entity that provides data, including, but not limited to, servers, systems, users, data creators, or the like, as well as any constituents, groups or organizations related thereto (e.g., users of such systems and/or employees of such data creators). In another example, the data discovery platform may receive data sets from an "indexing engine," which may refer to any entity that operates on source data and/or data sources to produce the ancillary data sets described herein, such as systems, software applications, users, and the like. The term "indexing engine" may be used interchangeably with like terms such as "data profiler," "data surveyor," "data indexer," "data extraction entity," or "data harvester." In some embodiments, ancillary data sets provided by an indexing engine may be converted, refined, or otherwise processed by the data discovery platform to conform to a specified format or standard used by the data discovery platform for generating abstracts.

The generated abstracts may be created in a uniform fashion and/or made available in a common medium independently of the underlying data type or source from which they are generated. In some embodiments, the representative abstracts generated based on the ancillary data may be specifically adapted for visually displaying information to a human user entity (e.g., on a suitable visual interface of a device). Such abstracts may be referred to as "visually representable" or "visualizable" abstracts, and any descriptions herein relating to abstracts may also be applied to visually representable abstracts. Visually representable abstracts may provide a succinct representation of the source data, thus enabling users to quickly comprehend the data without having to access and directly examine the data. Any combination of elements within such abstracts may, in some embodiments, be visually represented (e.g., with maps, charts, graphs, outlines, images, videos, and other visual assets), with different combinations or subcombinations shown depending on context, user preference, etc. The abstract, and/or the visual representation thereof, may be augmented or supplanted by third parties. For example, one or more visual representation(s) of the abstract may include facilities whereby third parties, such as data providers or indexing engines, may directly provide, to augment the visual representation, additional content relevant to the data being represented. Advantageously, such visually representable abstracts may enhance the clarity and comprehensibility of data, such as very large or complex data sets which may otherwise be opaque to human users. Furthermore, visually representable abstracts may facilitate interaction with and manipulation of the data. For example, abstracts derived from data may be visually represented, (e.g., on a map and/or in an aggregated format), such that users may differentiate and/or select the underlying data based on the visual representation (e.g., "meta-visualization" or "meta-analytics").

In addition to acting as a visual presentation layer, the abstracts generated by the data discovery platform may be used as a basis for managing source data (e.g., the organization, presentation, dissemination, marketing, searching, monitoring, and similar activities related thereto). For example, metadata or other ancillary data derived, stored and/or acquired by the data discovery platform may be employed to generate representative abstracts of data, which in turn may be used as the basis of managing that data. In some embodiments, the abstracts may include searchable identifiers (e.g., tags) and/or access modalities (e.g., links) to related abstracts, thereby facilitating data search, discovery, and navigation. As another example, the abstracts may include facilities (e.g., links) for providing access to the source data. Consequently, the abstracts may be used to control access to the data (e.g., by employees, clients, etc.). The abstracts may be shared between users (e.g., via social networks, email, links, and the like) regardless of the form, location, infrastructure, and/or organization of the underlying data assets, so that the associated data set(s) themselves need not be moved or transferred in order to be accessed by other users. Thus, the sharing of abstracts may, in some embodiments, be agnostic and independent of changes to the underlying data. Additionally, the actions associated with sharing abstracts (e.g., via social networks, email, links, and the like) may be tracked by the data discovery platform so as to internally develop a network representing relationships between users. Furthermore, in some embodiments, the data discovery platform may be configured to monitor the source data for the occurrence of specified events, and provide abstracts and/or notifications representative of such events to users.

Furthermore, the data discovery platform may be used to generate abstracts representing other types of information besides data assets, such as other abstracts, human or other creative entities (e.g., the data provider or owner), or groups or collections thereof. Such facilities may, for example, be used to create an abstract that summarizes an entire collection of a given data creator's other abstracts, and thus effectively be a summary of that data creator. Other metadata or ancillary data may be inferred from these relationships. In the example just described, the system may infer that the data creator is an "expert" based on the metadata generated from its interactions with the system (e.g., the nature and quantity of their data holdings, the nature and quantity of the abstracts created, etc.). Thus, an abstract generated for the data creator effectively summarizes the data creator so as to create a searchable index of the data and expertise held by that data creator. Such facilities may apply to a data creator at any level within a given informational hierarchy. In some embodiments, the data creators, data providers and other users represented by such hierarchically organized abstracts are human entities. In such embodiments, abstracts associated with such data creators, data providers and/or users may represent a cumulative summary of the associated entity's human expertise, based on the metadata associated with the abstract (e.g., the tags, use analytics, etc.). Similarly, collections or taxonomies of such abstracts may represent and/or summarize the human expertise of the group of entities represented by such collections or taxonomies. In some embodiments, a given abstract itself may also represent groups, collections or taxonomies of human entities. For example, an abstract representing a group of human entities may be derived from individual abstracts representing one or more of the human entities within the group, and thus summarize the expertise of the group itself as well as the data assets associated with each of the human entities. It is contemplated that such a group may involve any organization of human entities, such as a functional working group, an enterprise, a corporate division, or a cross-functional interest group.

The data discovery platform described herein may be implemented within any suitable environment and across any combination of data provider(s), distributed computing system(s), entities and/or standalone entities, and/or hardware. For example, the data discovery platform may be implemented as a layer between an information source and/or source data (e.g., provided by a data provider) and a distributed computing service provider, and by using one or more of the abstraction strategies described herein (e.g., metadata extraction and/or data modeling schemes), provide the data provider with an efficient, compact representation of its data holdings, as well as pass through the well-known advantages of storing data via a distributed computing service, such as scalability, economy, ubiquity of access, reliability and the like. Such techniques may also include one or more facilities for streamlining the processing of a data provider's data holdings by decreasing the local resources (e.g., of the data provider) necessary to do so. Furthermore, a data discovery platform may expose user account functionality to data providers in order to, for example, control access to the data by employees, clients or others. Notably, the data discovery platform does not typically modify the underlying data holdings during the creation, management, and manipulation of abstracts, thereby facilitating integration of the data discovery platform into the data provider's existing ecosystem.

A distributed computing resource provider may implement a plurality of computing resources, such as data stores, processors, storage devices, memory and the like, as well an abstraction layer that allows, for example, virtualized and/or machine instances (e.g., those that have direct hardware access, including bare metal and/or other hardware instances) to run independently of the underlying computing resources. Such resource-independent instances are herein referred to as "virtual machines," though the term contemplates not only virtual instances, but also machine instances. The data discovery platform may be implemented as a separate entity from that of the distributed computing resource(s), or, in some embodiments, some or all components of the data discovery platform may be implemented by the distributed computing resource provider as or upon, such as virtual machines exposed therefrom. In some embodiments, the data discovery platform may be implemented within a private environment, such as on a data provider's existing hardware and/or within a data provider's existing network architecture (e.g., "behind the firewall"). The data discovery platform may be implemented upon virtualized computing instances (e.g., virtual machines) or may, in the alternative, be provided as a discrete, physical hardware appliance. The system is configurable to use any data store (e.g., data storage hardware or virtualized storage) a data creator or system integrator elects. For example, the system may be configured to use preexisting private storage hardware, public cloud storage facilities, or a combination of the two.

FIG. 1 illustrates an example environment 100 in which a data discovery platform 102 may be implemented. As with all examples provided herein, any component described in connection with FIG. 1 may be implemented as physical entities, conceptual entities, or some combination of the two. For example, any number of components or constructs may be combined in any fashion so as to integrate some or all functionality within a given component or construct without deviating from the spirit or scope of the invention disclosed herein. The data discovery platform 102 and associated data storage system(s) 104 may be implemented across a distributed computing system 106, which may include public cloud computing resources. One or more individual users 108 may access the data discovery platform 102 (e.g., through a user application, such as a local application, web browser, etc.) using a suitable network connection. Any network connections explicitly or implicitly used herein may be of any suitable type, such as via a clear Internet connection, a virtual private network (VPN), wireless network, local area network (LAN), wide area network (WAN), proprietary network connection, and/or the like.

The data discovery platform 102 may be configured to receive requests from the user 108 (e.g., via a user application) to generate representative abstracts of source data. Such source data may include data assets stored in a user data storage system 110, which may be a storage subsystem on the user's local machine. In some examples, the user 108 may initiate a request for abstract generation by transferring data assets from the user data storage system 110 to the data discovery platform 102 (e.g., to an associated data store of the system 102 such as the data storage system 104). Alternatively or in addition, the user 108 may initiate a request by providing the data discovery platform 102 with data identifiers associated with the data assets. Such data identifiers may include, for example, metadata, location information, and/or descriptive tags for the data assets, as well as any other data sets of the data asset enabling the data discovery platform 102 to locate and connect to the data assets within the user data storage system 110. The data discovery platform 102 may process the user data assets to generate ancillary data thereof (e.g., metadata), and use the ancillary data to create abstracts representative of the data assets. In some embodiments, the data identifiers provided by the user may already include ancillary data useable for abstract generation, or include information enabling the data discovery platform 102 to locate preexisting ancillary data associated with the data assets. In such instances, abstract generation may occur without necessitating the transfer of the user data assets themselves to the data discovery platform 102.

In some embodiments, the user 108 may also initiate abstract generation from data assets through a third party application 112 interacting with the data discovery platform 102 via a suitable application programming interface (API) exposed by an implemented system 102. An example API may allow any authorized third party application 112 to create abstracts by pushing, via the API, static or rich media objects, analytical data, file locations, tags, user-defined data, or any other suitable data type. For example, the user may provide an authorized third party application 112 with data assets and/or data identifiers of the data assets, and the third party application 112 may request abstract creation by pushing relevant data, via the API, to the data discovery platform 102. Such relevant data may include the data assets themselves, metadata and/or other ancillary data derived from the data assets, data identifiers, or any other data relevant to abstract generation. Alternatively or in addition, the third party application 112 may actively create data (e.g., under the direction of the user 108) and directly transmit the data to the data discovery platform 102. Such an API may be integrated with the third party application 112 in any appropriate manner. For example, the API may include a facility to extract key data (e.g., metadata) for common or standard (e.g., predefined) data formats so as to ease integration into the third party application 112, as well as improve the quality of the resultant abstract. In some examples, the API may also include a facility for defining different levels of permission customizability based on the nature of the third party application 112 (as well as the data provider or user 108 associated with the third party application 112).

Once created, the abstracts may be stored by the data discovery platform 102 (e.g., in the data storage system 104) for future access, such that the data discovery platform 102 also serves as a central repository for generated abstracts. The created abstract may be saved in such a fashion (e.g., as an HTML or similar object), so as to enable further use of the asset by the committing user, such by displaying the abstract to the user in an appropriate application (e.g., via a suitable user interface such as a web browser or other application). In some embodiments, similar functionality may be integrated within proprietary applications so as to connect such applications and transact data assets and other information between the applications and the system. The created abstract may be updated or manipulated in any fashion as described in further detail elsewhere herein. In some embodiments, once an abstract is created using the API, the API may return a preview image or other information representing the created abstract back to the third party application 112 that provided the data for display to the user. The API may also provide users, data creators, and other entities the ability to embed created abstracts, as well as other related functionality (e.g., search functions), into third party applications, websites, media content, and the like.

Figure 2:
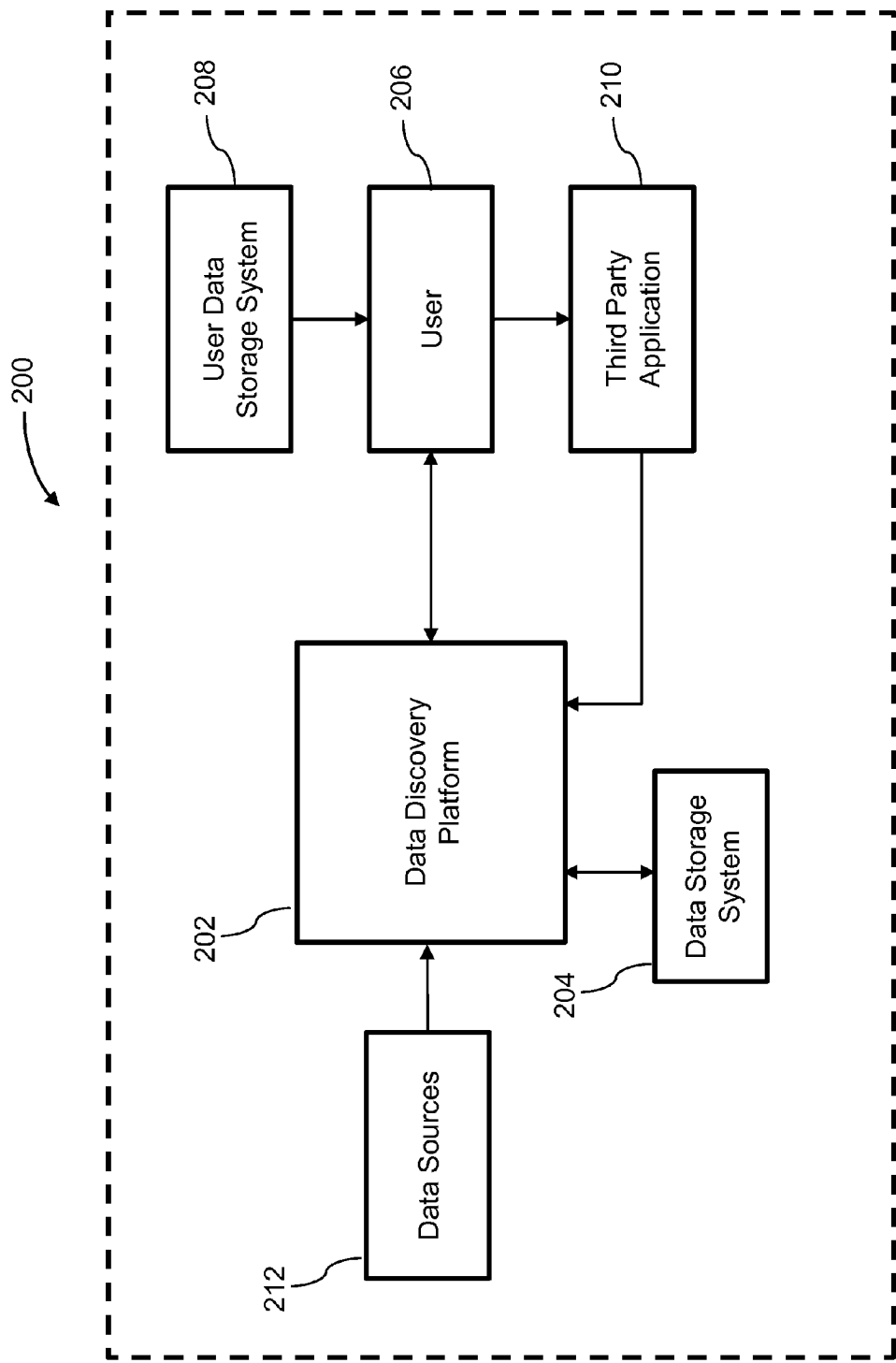
FIG. 2 shows another illustrative example of an environment in which a data discovery platform may be implemented in accordance with at least one embodiment.

FIG. 2 illustrates another example of an environment 200 in which a data discovery platform 202 may be implemented. The environment 200 may be a private or internal environment within the preexisting network architecture of a data provider (e.g., behind a firewall of an enterprise), such that the data discovery platform 202 operates entirely within the private environment 200 and is thus inaccessible to unauthorized external users. The data discovery platform 202 may be implemented as a physical hardware appliance or upon virtual machines. The data discovery platform 202 may be associated with one or more suitable data storage systems 204 (e.g., data storage hardware or virtualized storage) elected by the data provider, a system integrator, or another entity. The data storage systems 204 may be implemented within or outside of the private environment 200, and may include private storage hardware, private and/or public cloud storage resources, or suitable combinations thereof.

Individual users 206 may connect to and access the data discovery platform 202 from within the private environment 200. Alternatively, in some embodiments, authorized users may also be able to connect to the data discovery platform 202 from outside the private environment 200. Similar to the embodiments described herein with respect to FIG. 1, the users 206 may initiate abstract generation based on user data assets of a user data storage subsystem 208, either through direct requests to the data discovery platform 202, or indirectly through a third party application 210 interacting with the data discovery platform 202 via a suitable API. In some instances, the data discovery platform 202 may feature clientside integration with local user machines. For example, the data discovery platform 202 may allow connected users 206 (e.g., individual users on a network connecting to the system 202) to integrate the system's functionality with their local applications and/or operating system so as to, for instance, manipulate files, folders and other source data within and to the system 202 in a fashion similar to performing the same actions on local hardware. In some of such examples, when a user 206 commits a data asset (or any other data relevant to abstract generation) to the data discovery platform 202 from their local machine, that asset is transferred to the system 202 and an abstract is created. The transferred asset is then be either deleted or routed to an existing storage subsystem (e.g., the data storage systems 204) as the system administrator, data creator, or user 206 may determine. In another example, one or more components of the data discovery platform 202 may be installed on the local user machine. Accordingly, abstract generation may be a local process occurring entirely on the user machine without necessitating any transfer of data to an external entity.

The data discovery platform 202 may be further connected to a plurality of data sources 212 of the data provider, and such data sources 212 may be situated within the private environment 200, stored in public cloud storage, or combinations thereof. For example, the data sources 212 may be data files, databases, directories, or other assets of an enterprise. In some embodiments, the data discovery platform 202 may be integrated into the data provider's (or data creator's) existing database infrastructure and/or middleware so as to act as a virtual central repository of the data provider's data holdings (e.g., as represented by the generated abstracts) through which requests related to data storage, dissemination, and management may be channeled. For example, the data discovery platform 202, when integrated in this fashion, may be configured to automatically create and store abstracts for any data sources connected to the system 202 and/or data passing through the system 202 (e.g., based on metadata and other ancillary data derived from the data sources 212 as described elsewhere herein). Such abstract creation may occur in a batch process without requiring specific user requests or other user-initiated positive interaction. Furthermore, by providing a central repository of representative abstracts, the data discovery platform 202 may itself act as an abstraction layer for the interaction between a data provider, users, and the underlying storage infrastructure, in that neither the abstract nor the user 206 need be concerned with the underlying storage infrastructure of the source data (e.g., the data sources 212 may include data stored across different infrastructures and in different forms or locations). For example, using the abstracts, users may rapidly navigate through the totality of the data provider's data holdings without having to access each data source and source data asset individually.

In such embodiments where file-based data assets are transacted between the data provider and/or user 206 and the data discovery platform 202, one or more approaches may be implemented to process the transacted assets in a file format-specific fashion. In some embodiments, the transacted asset is parsed using a preprocessor or other type of data-reading facility that resides at or topologically near the source of the data asset (e.g., at the data provider's or user's computer system upon which the asset presently resides), in the data discovery platform 202 itself, or some combination thereof (e.g., different types of file types handled by preprocessors at different topological locations). The preprocessor may ingest the asset (e.g., one or more data files) so as to determine the type of file being ingested, and extract one or more sets of metadata (or other ancillary data) compliant with the determined file type. Such a preprocessor may be developed, provided, specified and/or integrated by any appropriate entity, such as the data provider, a maintainer of the asset itself, or an entity associated with a standards body.

In some embodiments, the preprocessor may rely on various existing functionalities of the application, operating system or other system with which the data discovery platform 202 is being integrated. For example, one potential implementation may include attaining basic metadata known to the client (e.g., file names, file sizes, file dates and the like), as well as more detailed metadata for specific file types already known to the system (e.g., in the case of JPEG images, EXIF information, pixel dimensions, and the like). Such an implementation may be augmented by a server- or abstraction system-side preprocessor for other file types, thereby using a multitiered approach to metadata modeling and extraction for optimal efficiency.

Figure 3:
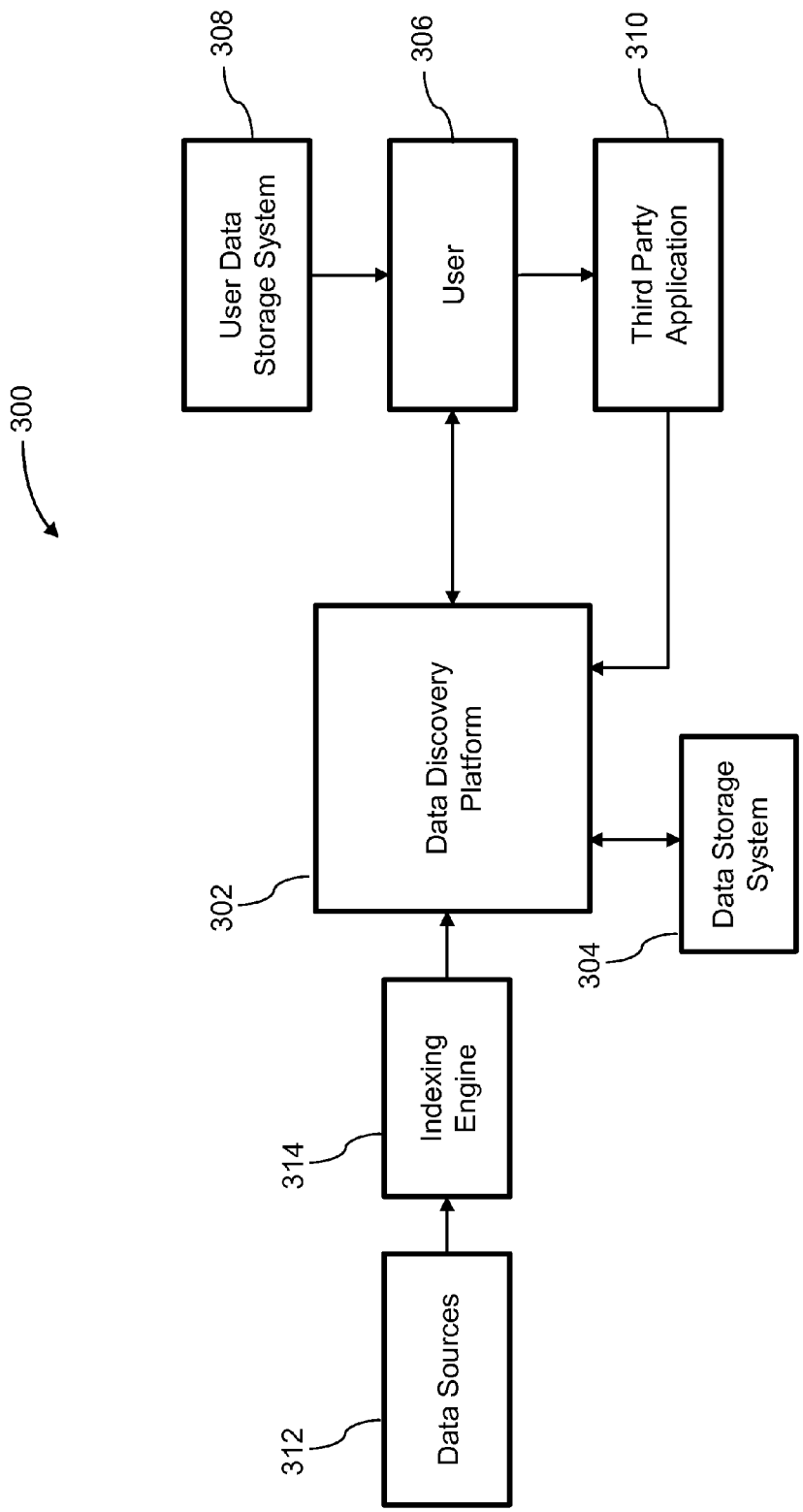
FIG. 3 shows yet another illustrative example of an environment in which a data discovery platform may be implemented in accordance with at least one embodiment.

FIG. 3 illustrates yet another example of an environment 300 in which a data discovery platform 302 may be implemented. Similar to the exemplary implementations described with relation to FIG. 2, the data discovery platform 302 may be connected to data storage system(s) 304, may be configured to generate abstracts in response to requests initiated by one or more users 306 (e.g., requests regarding data assets from the user data storage system 308, and provided directly or through a third party application 310), and may be connected to a plurality of data sources 312 of a data provider. The data discovery platform 302 may be configured for automatic batch creation of abstracts from the data sources 312, as previously described herein. However, rather than directly connecting to and extracting data from the data sources 312, the data discovery platform 302 may interface with one or more indexing engines or other intermediary application(s) 314 implemented between the data discovery platform 302 and the data sources 312. In some embodiments, such indexing engines may already be integrated with and operating on the data sources 312 (e.g., performing search indexing, tagging, metadata extraction, and other functionalities related to data abstraction) as part of the data provider's preexisting data infrastructure. The data discovery platform 302 may be implemented as an additional abstraction layer on top of the indexing engine 314, such that the initial abstraction of the data sources 312 produced by the indexing engine 314 is further abstracted and/or refined by the data discovery platform 302 to generate visually representable abstracts.

Figure 4:
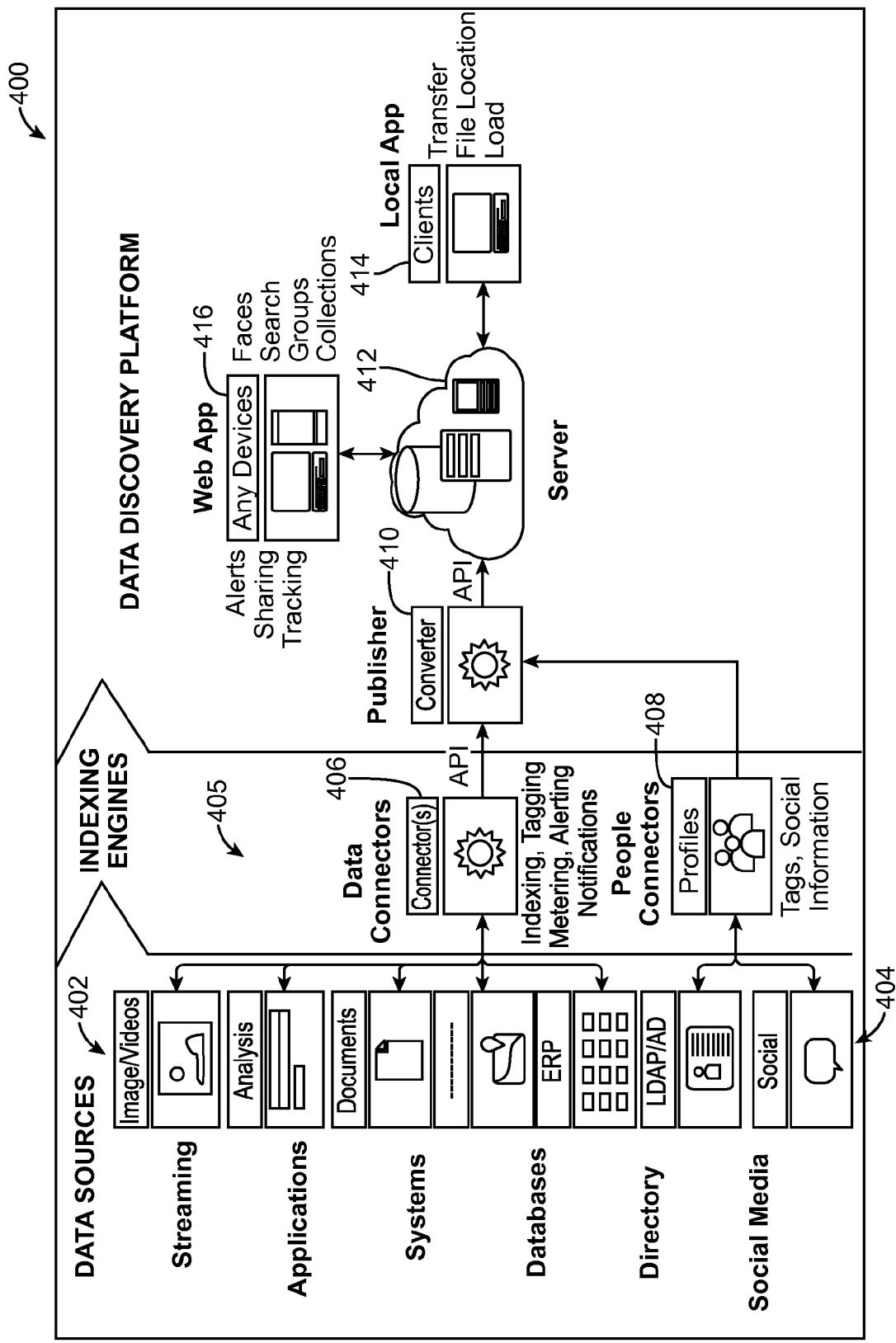
FIG. 4 shows an illustrative example of a data discovery platform in accordance with at least one embodiment.

FIG. 4 illustrates an example topology 400 for a data discovery platform. The data discovery platform may be employed to manage a plurality of heterogeneous data sources 402 of a data provider. Such data sources 402 may include streaming data sources (e.g., video, images, analytics, tickers, sensor feeds), applications (e.g., proprietary, analytics, spatial), systems (e.g., enterprise resource planning (ERP) systems, customer relationship management (CRM) systems, email, business intelligence (BI) systems such as Tableau®), databases, (e.g., archives, Structured Query Language (SQL), noSQL), data files (e.g., documents), distributed computing systems (e.g., Hadoop®), web feeds and other endpoints (e.g., social media feeds, news feeds), and the like. The data discovery platform may also be connected to a plurality of human data sources 404 representative of one or more human entities, such as directories (e.g., Lightweight Directory Access Protocol/Active Directory (LDAP/AD), white pages, or other internal/proprietary directories providing information about employees) and social media profiles (e.g., LinkedIn®, Facebook®, Twitter®, etc.). The human data sources 404 may either be included with the heterogeneous data sources 402 or be provided separately from the heterogeneous data sources 402.

The data discovery platform may interface with the heterogeneous data sources 402 via one or more indexing engines 405. As previously described herein, the indexing engines 405 may encompass any intermediary entity operating on the heterogeneous data sources 402 in order to generate ancillary data representative thereof. The indexing engines 405 may be implemented, in some examples, to access and read data from the data sources 402, derive ancillary data from the data sources 402, and then provide the ancillary data to a downstream entity. The derivation of ancillary data by the indexing engines 405 may involve one or more data analysis and/or processing steps, such as extraction of metadata from the data, indexing the data for searching, tagging the data with one or more predefined tags representative of the content of the data, filtering the data to remove unwanted or irrelevant data, summarizing the data to aggregate multiple data items ("collections"), analysis of the data content to generate representative metrics and/or analytics, and the like. Furthermore, the indexing engines 405 may include other functionalities in addition to data abstraction, such supporting data search across the generated search indices, performing metering of data passing through the indexing engines 405, and/or generating notifications or alerts related to the heterogeneous data sources 402.

For example, the indexing engines 405 may include one or more data connectors 406 employed to monitor the heterogeneous data sources 402 and generate an initial abstraction of the data encompassed by the heterogeneous data sources 402. Such data connectors 406 may encompass suitable applications and/or middleware (e.g., preexisting metadata indexing products provided by third parties) configured specifically to interface with the heterogeneous data sources 402. For example, at least some of the data connectors 406 may possess knowledge of the specific format, standards, or structure of data from the heterogeneous data sources 402, and may use this knowledge as a basis for abstracting the data provided by the data sources 402. As another example, at least some of the data connectors 406 may be customized based on the specific type of the associated data source, such that different types of data sources are abstracted by different types of indexing engines. The data connectors 406 may be configured to perform data-related functionalities such as indexing, tagging, metering, and/or alerting, as described above.

In embodiments where the human data sources 404 are provided separately from the heterogeneous data sources 402, the indexing engines 405 may include one or more people connectors 408 separate from the data connectors 406. Such people connectors 408 may be adapted specifically to operate on human profile data provided from the human data sources 404 in order to generate abstractions of data representative of human entities. Such human entities may include data creators, users, employees, clients, experts, and other individuals, as well as groups, organizations, or associations composed of a plurality of individuals. Relevant human profile data for abstract generation may include, for example, biographical information, contact information, technical expertise, data ownership or creatorship, associations (e.g., with other human entities and/or with data assets), roles, interests, activities, social information (e.g., social media presence), and so on. In some embodiments, the human profile data may be existing profiles of the human entities (e.g., social media profiles, corporate profiles from internal directories such as LDAP/AD), such that the data discovery platform provides abstracts of the human entities based on information in the existing profiles. Similar to the data connectors 406, the people connectors 408 may be configured to operate on the human profile data to perform any suitable data-related functionality (e.g., indexing, tagging metering, alerting, etc.). Abstracts generated based on human profile data may be operated on similar to abstracts generated based on other types of data assets, as described in further detail elsewhere herein.

In some embodiments, the initial data abstractions provided by the indexing engines 405 (e.g., generated by data connectors 406 and/or people connectors 408) may be in a form specific to the type of indexing engine, connector, and/or data source, and may not necessarily be adapted for generating abstracts such as visually representable abstracts. Accordingly, the data discovery platform may implement a "publisher" or "converter" 410 downstream of the indexing engines 405 to "translate" the initial data abstractions into a form suitable for abstract generation. For example, the publisher 410 may convert the ancillary data provided by the indexing engines 405 to a suitable format, structure, or standard usable by the data discovery platform for abstract creation. The publisher 410 may perform additional abstractions on the ancillary data using analysis and/or processing steps similar to those employed by the indexing engines 405, in order to further refine the abstraction to improve the quality of the resultant abstract.

The publisher 410 and the indexing engines 405 may interact in any suitable manner to facilitate abstract generation. In some embodiments, at least some of the indexing engines 405 may generate a plurality of ancillary data sets, and select only a subset of these ancillary data sets to be pushed onwards for abstract generation (e.g., a "data push model"). Consequently, the indexing engines 405 may play a larger role in determining the ultimate content of the abstract. Alternatively or in addition, the publisher 410 may accept a plurality of ancillary data sets from the indexing engines 405, and select only a subset of these ancillary data sets to be converted and used for abstract generation (e.g., a "data pull model"). In such embodiments, the publisher 410 may be primarily responsible for the content of the resultant abstract. The modality to be used for abstract generation may be determined by the user, data provider, abstract creator, system administrator, or other related entity, and may also be determined based on the specific connector and/or convertor applications implemented in the data discovery platform, as well as the specific source data used for the creating the abstract.

The converted data sets produced by the publisher 410 may be provided to an abstract creation system or server 412 configured to create visually representable abstracts based on the converted data sets. The abstract creation system 412 may be implemented (e.g., as a server) across any suitable combination of private hardware or public and/or private distributed computing resources in order to generate abstracts (e.g., as HTML objects or the like) based on the data obtained from the publisher 410. The abstraction creation system 412 may be associated with storage subsystems for the generated abstracts and thereby also act as a central abstract repository. In some instances, such storage subsystems may also be used for storage of data assets utilized for abstract generation, as elected by the data provider or a system administrator.

Additionally, the abstract creation system 412 may also support other functionalities related to the abstracts, such as tagging, aggregation, content search, and the like. As another example, the abstract creation system 412 may also interface with other applications (e.g., analytics tools) to enable additional analyses to be performed on the generated abstracts. In yet another example, the abstract creation system 412 may, in conjunction with the indexing engines 405, support searching of the heterogeneous data sources. For instance, the abstract creation system 412 may forward such search requests to one or more indexing engines 405 having search functionality (e.g., using search indices generated during data abstraction as described herein), and return the search results provided by the indexing engines 405 to the user. Additional details on exemplary implementations of abstract searching are provided elsewhere herein.

The data discovery platform may include one or more user applications enabling user interaction. For example, FIG. 4 depicts exemplary user applications including a local application 414 (e.g., a "local app" installed on a client machine, such as a utility added to the operating system) and a web application ("web app") 416 (e.g., a "web app" accessible from any user device). However, it shall be understood that the user application(s) of the data discovery platforms described herein may be of any type and may be implemented across any suitable combination of environments and/or computing resources. In some embodiments, for instance, the user application(s) may be entirely web-based. Conversely, the user application(s) may be deployed entirely on local user machines. Furthermore, any functionalities described herein in the context of the local application 414 or the web application 416 may be performed by any suitable implementation of the user application(s).

For example, in addition to the batch abstract creation from heterogeneous data sources described herein, the data discovery platform may also accommodate user-initiated abstract creation, in a manner similar to the implementations described herein in relation to at least FIGS. 1 and 2. Such user-initiated abstract creation may be accomplished via any suitable user application, such as a local application 414 interacting with the abstract creation system 412. The local application 414 may, for instance, provide a user interface enabling users to transfer and/or load user data assets to the abstract creation system 412, or provide data identifiers (e.g., file location) enabling the abstract creation system 412 to connect to the data assets. The local application 414 may include a third party application pushing user data assets to the abstract creation system 412, as previously described herein.

The visually representable abstracts generated by the abstract creation system 412 may be displayed to a user via any suitable user application, such as through a web application 416 accessible from any suitable user device. The web application 416 may further be employed as an interface through which users may perform additional actions mediated by the abstract creation system 412. For example, the web application 416 may enable users to modify the generated abstracts, such as by adding tags, editing the content, configuring the appearance, and so on, and these modifications may or may not be propagated back to the underlying source data. In such instances, the abstracts may include a version or provenance tracking function to, for example, show and/or track changes to the data and the abstract itself over time, as well as provide historical versions of the abstract (and in some cases, historical versions of the represented data). Additionally, the web application 416 may also enable users to share abstracts (e.g., via social media, email, links), search the abstract repository, organize the abstracts (e.g., into collections, folders etc.), track abstracts (e.g., usage statistics, modifications of the abstracts and/or the source data), and create, transmit, and/or receive alerts relating to abstracts or the underlying data assets (e.g., event-based alerting, as described in further detail elsewhere herein). In another example, the web application 416 may support functionalities relating to user groups (e.g., based on interests, expertise, associations, data ownership, etc.), including facilities for users to form, search, communicate with, join, and/or leave such groups. In some embodiments, the web application 416 may mediate user interaction with other users, such as by tracking the activity of other users (e.g., activities relevant to a specified abstract), enabling discovery of potentially relevant users (e.g., based on activity, data and/or abstract ownership or creatorship, tags, shared membership in groups or associations, etc.), or connecting to other users (e.g., via functionalities embedded in a suitable user application, or other communication methodologies such as email or social media).

The topology 400 described herein may be implemented in any suitable manner. Connections and/or interactions between different components of the topology 400 may, for example, be mediated by suitable APIs (e.g., between the indexing engines 405 and publisher 410, between the publisher 410 and the abstract creation system 412, etc.). In some embodiments, certain components may be implemented as APIs rather than discrete applications. As previously mentioned, any number of components may be combined with each other in order to integrate their individual functionalities. For example, the publisher 410 may be integrated into the indexing engines 405 and/or the abstract creation system 412, the data connector 406 may be combined with the people connector 408, and some functionalities of the local application 414 may be combined with the web application 416, or vice-versa. Various components may be implemented on virtual and/or machine instances, and across private or public distributed computing resources, hardware appliances, or suitable combinations thereof.

In some embodiments, a "package" may be provided that integrates some or all of the concepts disclosed herein. For example, a package may include and/or integrate (e.g., into an existing network of an enterprise): various aspects and/or components of embodiments of the data discovery platform described herein; a "publisher" (e.g., an API or other input/output facility) that allows users of an enterprise to provide data to the integrated data discovery platform to generate abstracts; and implementation of the generated abstracts (e.g., exposure of the data, by way of the abstracts, to users within and/or outside of the enterprise, such as via search capabilities, dynamic displays of the abstracts, and other capabilities of the visually representable abstracts described herein). Such a package is contemplated as being modular, and its functionalities, level of integration, etc. may be customizable based on, the context and/or constraints of the enterprise, such as its network topology, ontology, level of functionality purchased, or any other such requirements as defined by the implementer of the "package" or the requesting enterprise.

The visually representable abstracts generated by the data discovery platforms described herein may be interactive, dynamic and/or context-sensitive, and may visually represent any type and number of source data assets. In embodiments where a plurality of data assets are represented, a plurality of associated abstracts may be presented in a common medium independent of the potentially disparate source, infrastructure, location, context, etc. associated with the underlying data. The visually representable abstracts may be displayed on any suitable device having a display interface, including monitors, screens, mobile devices (e.g., smartphones, tablets, personal digital assistants (PDAs)), laptops, computers, televisions, and the like, and such devices may be configured to accept user inputs for navigating and interacting with the abstracts (e.g., clicks, taps, touches, swipes, button presses, keyboard input, voice commands, gestures, etc.). The abstracts may be visually represented in any fashion appropriate for the context in which they appear (e.g., horizontally oriented, rather than vertically oriented, etc.). In some embodiments, the abstracts may be optimized for presentation on the specific device on which they are displayed (e.g., with respect to size, resolution, orientation, image quality, frame rate, method of user input, etc.).

In some embodiments, the visually representable abstracts may have a plurality of configurable "faces," or different contexts visually represented for the underlying data, each with a specific purpose that serves the broader goal of abstraction. Examples of such faces include: visual previews of the data itself (e.g., thumbnails); textual summaries describing the data asset, visual representations of associations and/or relationships between data assets (e.g., contextual and/or geographic maps, or hierarchical information); charts, graphs or other graphically embodied statistics, analytics and/or metrics related to the data or summarizing the content of the data; information regarding the creator of the data or the abstract; statistics relating to usage of the abstract, such as total number of views; digital object identifier (DOI)-based metrics such as overall market penetration or visibility of an abstract and/or the underlying data; interoperability/compatibility information regarding the data (e.g., which software applications are capable of working with the underlying data file); branding information (e.g., that of the creator of the data or abstract); or any other arbitrarily defined context (e.g., metadata type). Faces may include static elements, as well as interactive, dynamic and/or context-sensitive elements. For example, faces may include "live" elements of dynamic data assets (e.g., live data streams), and such live elements may be updated in real-time, at specified intervals, and/or in response to changes to the underlying data assets. In some embodiments, faces may be customizable (e.g., with regards to content, context, organization, design, etc.) by users, data providers, data creators, third party applications, information technology (IT) administrators, system administrators, or any other suitable entities.

The contexts represented by each face type may be based on ancillary data (e.g., metadata) associated with or derived from the source data in any form or by any manner, as previously described herein. For example, a face may partly be generated based on ancillary data that is automatically created by a data discovery platform generating the abstract (e.g., when processing the ingested data). As another example, a face may partly be generated based on ancillary data that is provided by (and possibly defined by) an owner of the data, and separately from the data itself. As yet another example, a face may be generated based at least in part on ancillary data provided by any intermediary entities interfacing between the source data and the data discovery platform (e.g., the indexing engines 405 or components thereof, such as data connectors 406 or people connectors 408). In any of these examples, the ancillary data may include: any information associated with the data itself, as well as information associated with the data provider (e.g., physical or electronic contact information for the data provider); basic information about the data or abstract, such as file size, file type, data source identification, data type, standards compliance, and the like; analytics related to the data or abstract, such as a price for the data or access thereto, information regarding the completeness, veracity, trustworthiness, freshness, or trackability of the data, the data's fitness and/or compatibility for one or more applications or uses, or other metrics; visual representations of the data such as thumbnail images, vector graphics, conceptual images, videos, animations, and the like; data provenance information; relationship information such as the data's relative position within one or more ontological hierarchies; and any other metadata as would be applicable to the data being surveyed.

In some embodiments, the visually representable abstracts may be presented to a user as a set of multiple faces, such that the entire set presents a comprehensive abstraction of the underlying source data over a plurality of different contexts. Notably, the faces within a set may represent diverse data assets, such that data derived from heterogeneous data sources and of different types, formats, contexts, etc. may all be represented in a single set. The faces may be presented in any sequence best suited for conveying the key concepts encompassed by the abstract. The selection of faces to be used to represent a set of data assets may be customized based on the content and contexts of the data, as well as the preferences of the data provider, data creator, abstract creator, or other related entities. The subset of faces displayed can be varied by a sufficiently authorized user, such as a data provider (e.g., the owner of the data in question), and may be sensitive to the identity and authorization level of the viewer of the abstract, such that different users viewing the same abstract may be presented with different sets of faces.

Figure 5A:
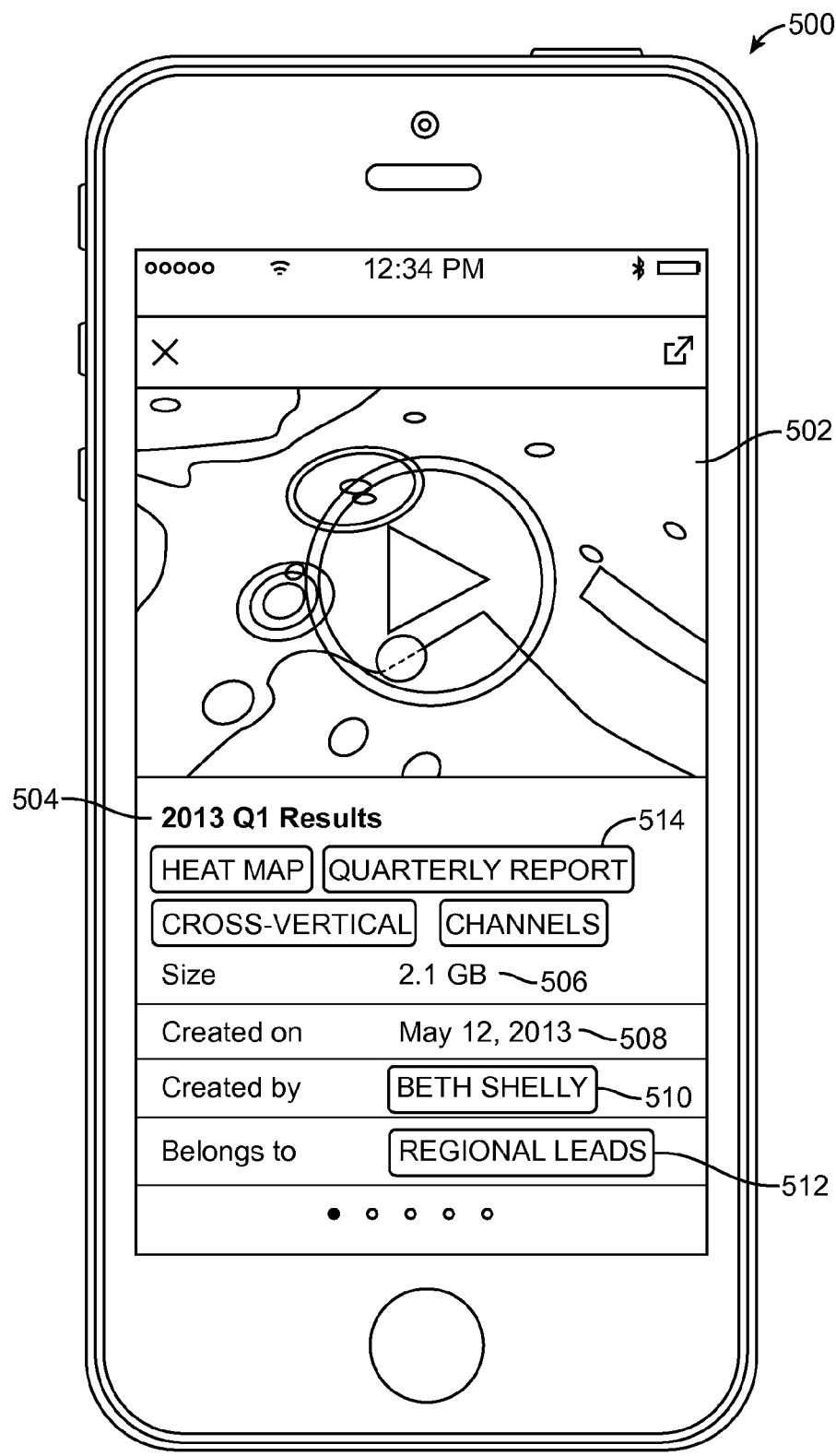
FIG. 5A shows an illustrative example of a "front face" of a visually representable abstract in accordance with at least one embodiment.

FIG. 5A illustrates an exemplary "front face" 500 of a visually representable abstract. The front face 500 may be the first face displayed to the user when viewing the abstract and may present an overview of the content of the abstract. The front face 500 may include a visual preview 502 of the source data. The visual preview 502 may be a thumbnail graphic representative of the source data, and may be static (e.g., an image) or dynamic (e.g., a video, 4D model, animation, etc.). The front face 500 may also include information summarizing the source data, such as a title 504, data file size 506, creation date 508, data creator 510, and/or data owner 512. Such information may be provided using text, graphics, or suitable combinations thereof. In some embodiments, the front face 500 may include one or more textual tags 514 associated with the abstract, as described in further detail elsewhere herein. As previously mentioned, although this and other examples herein are depicted as being displayed on a smartphone, these embodiments may be implemented on any suitable user device.

Figure 5B:
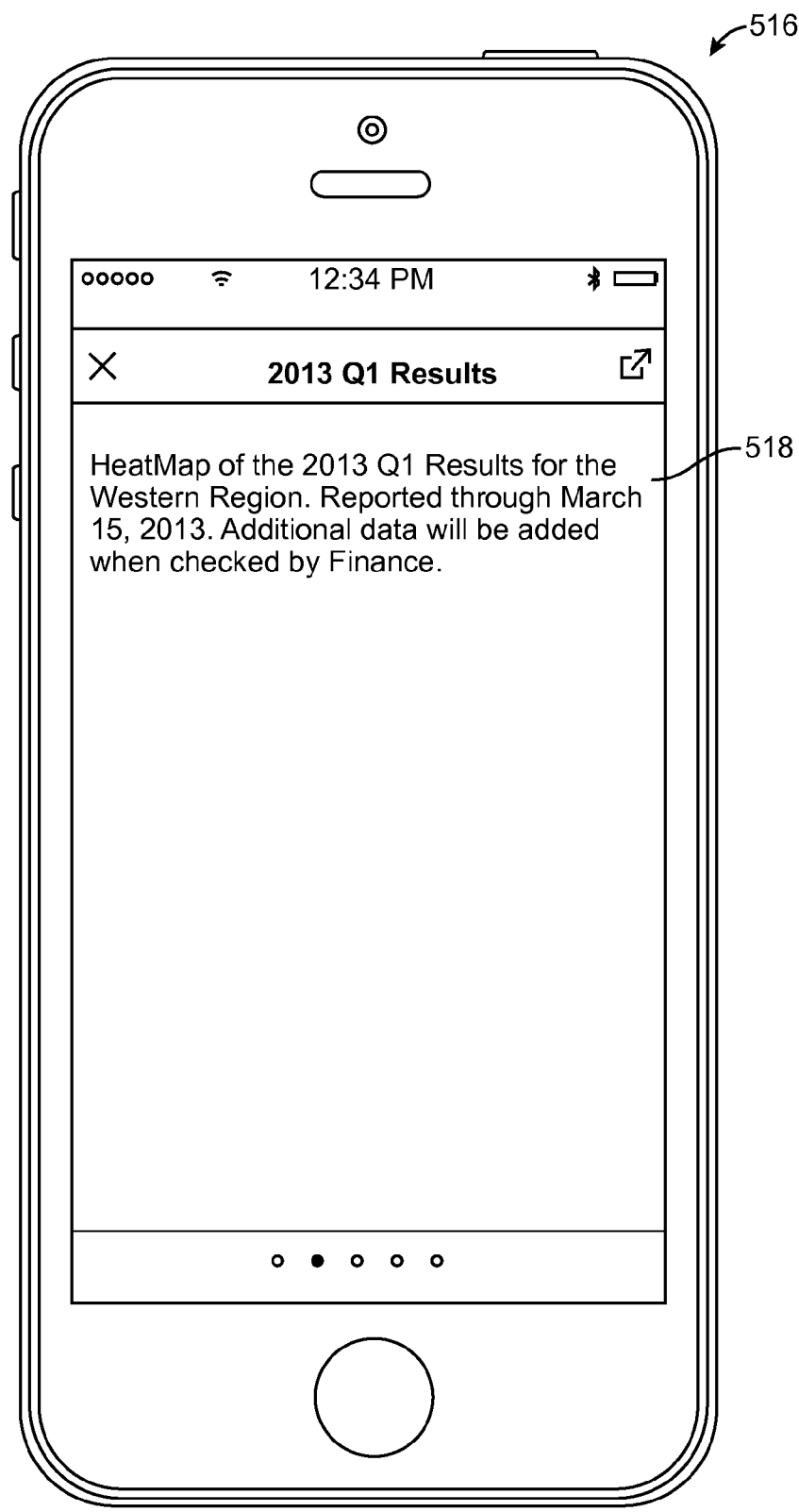
FIG. 5B shows an illustrative example of a "summary face" of a visually representable abstract in accordance with at least one embodiment.

FIG. 5B illustrates an exemplary "summary face" 516 of a visually representable abstract. The summary face 516 may be used provide a brief textual summary 518 of the content of the abstract. For example, the textual summary 518 may be a character-limited summary describing the data asset(s) represented by the abstract, and may be authored by the abstract creator (e.g., provided via user input during abstract generation), data provider or creator (e.g., provided in metadata), and the like. Alternatively, the textual summary 518 may be automatically created (e.g., by the data discovery platform, an indexing engine, etc.), for instance, based on the data asset(s) or metadata (or other ancillary data) derived from the data asset(s). The summary 518 may be configured to be edited after abstract generation, for instance, to provide updates reflecting changes in the state of the source data.

Figure 5C:
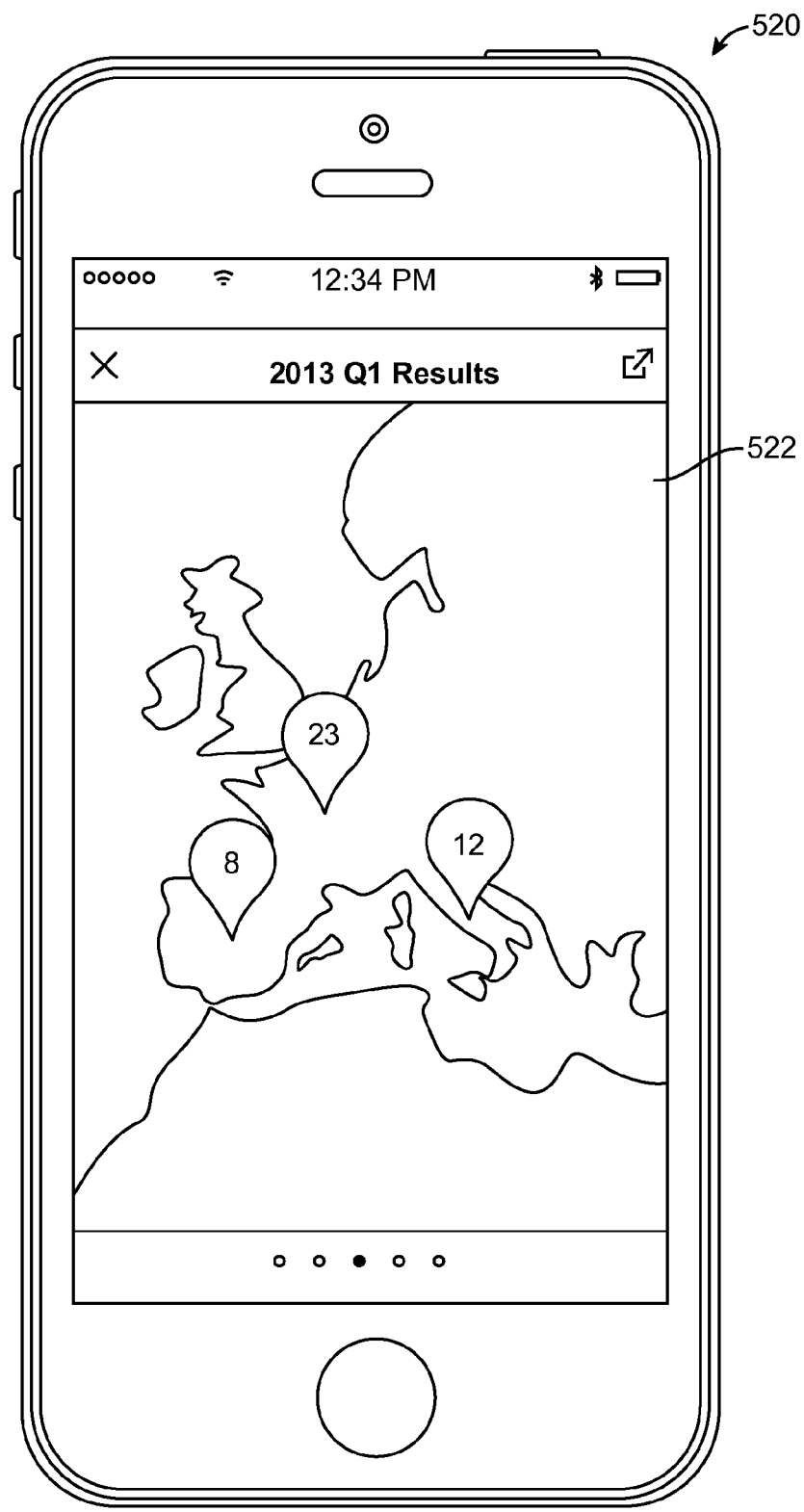
FIG. 5C shows an illustrative example of a "context face" of a visually representable abstract in accordance with at least one embodiment.

FIG. 5C illustrates an exemplary "context face" 520 of a visually representable abstract. The context face 520 may be used to represent the associations and/or relationships of the underlying source data relative to other data assets, human entities, and/or abstracts, or provide information regarding the context of the source data (e.g., relative, absolute, topological, virtual or geographical location of the data). For example, the context face 520 may include one or more embedded maps 522 (e.g., geographical, topological, conceptual) that locate the relationships of the represented source data. The maps 522 may be interactive, enabling functionalities such as zooming in or out, scrolling, rotating, and the like.

Figure 5D:
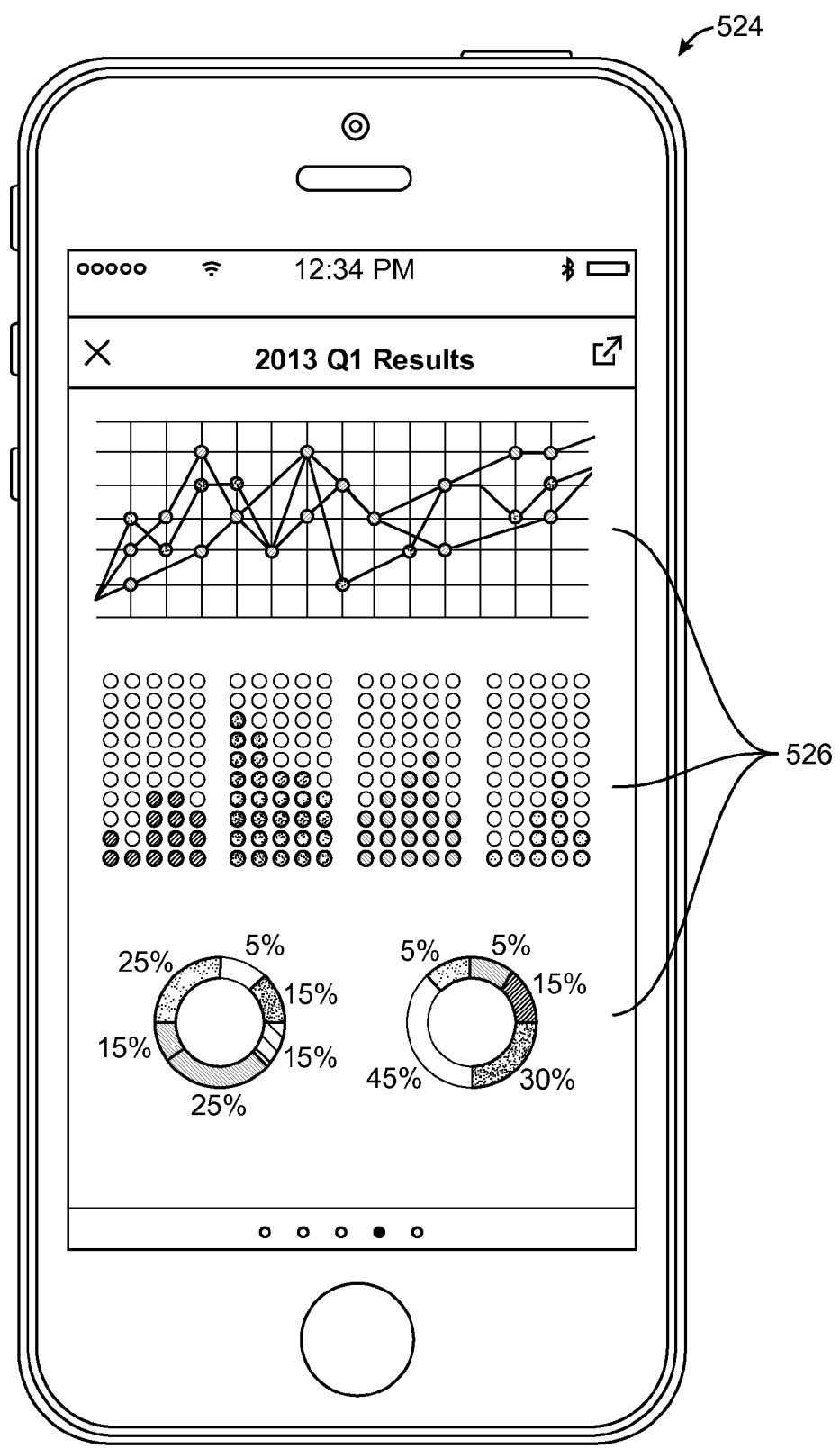
FIG. 5D shows an illustrative example of a "contents face" of a visually representable abstract in accordance with at least one embodiment.

FIG. 5D illustrates an exemplary "contents face" 524 of a visually representable abstract. The contents face may also be referred to as an "analytics face." The contents face 524 may be used to represent key information about the contents of source data. As another example, the contents face 524 may present key information provided by one or more underlying data sources. For instance, the underlying data source(s) (or a third party application connected to the underlying data source(s)) may provide a stream of visualizable information (e.g., sensor feeds, analytics dashboards, platforms for summarizing primary data streams such as business intelligence tools), and the contents face 524 may represent and/or re-visualize such information in a suitably abstracted manner. In a further example, the contents face 524 may represent key information about the contents of one or more previously generated abstracts, such as a statistics, metrics, and/or analytics derived from a collection of existing abstracts. Such key information may be represented in any suitable fashion. For example, the contents face 524 may include one or more graphic representations 526 (e.g., graphs, charts, images, models, etc.) summarizing the contents of the underlying data asset(s). In some embodiments, the graphic representations 526 may be static elements. Alternatively, the graphic representations 526 may be dynamic elements updated in accordance with the information provided by the underlying data source(s). For example, one or more of the graphic representations 526 may be a live, dynamically-updated visualization of a stream of data (or any other dynamic data source).

Figure 5E:
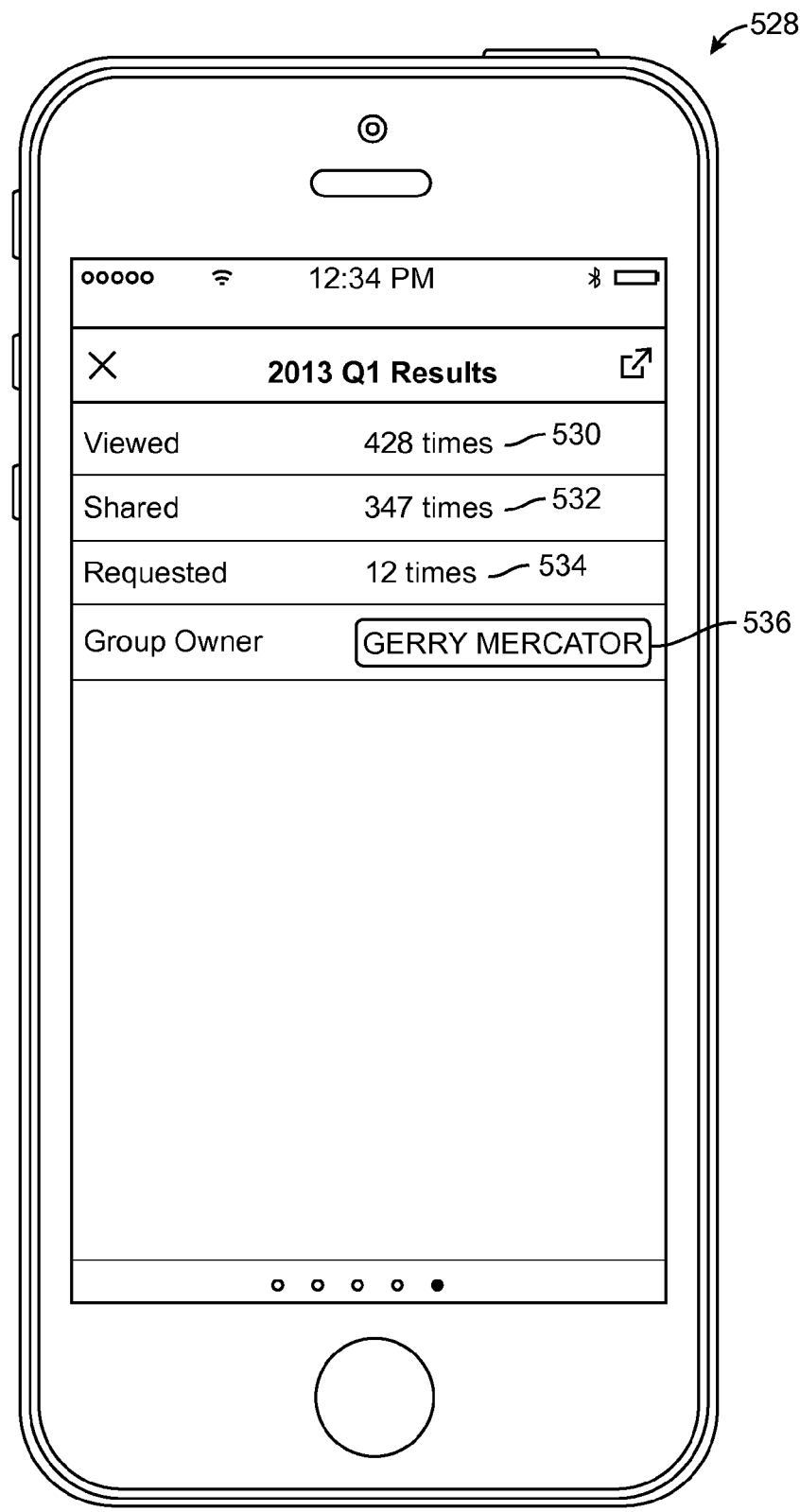
FIG. 5E shows an illustrative example of an "details face" of a visually representable abstract in accordance with at least one embodiment.

FIG. 5E illustrates an exemplary "details face" 528 of a visually representable abstract. The details face 528 may provide displaying additional extracted metadata about the underlying source data or other details not included in other faces of the abstract. For example, the details face may serve as an "impact face" providing metrics regarding the impact of the abstract and the associated source data, such as metrics generated based on a DOI assigned to the abstract. The metrics presented by the impact face 528 may assist users in forming judgments regarding the quality, relevancy, and reliability of the abstract and the underlying data. In some embodiments, the details face (or impact face) 528 may include statistics regarding the number of times the abstract has been viewed by users 530, shared 532, or requested 534. The details face (or impact face) 528 may also include information on ownership of the abstract, such as a group owner 536.

Figure 5F:
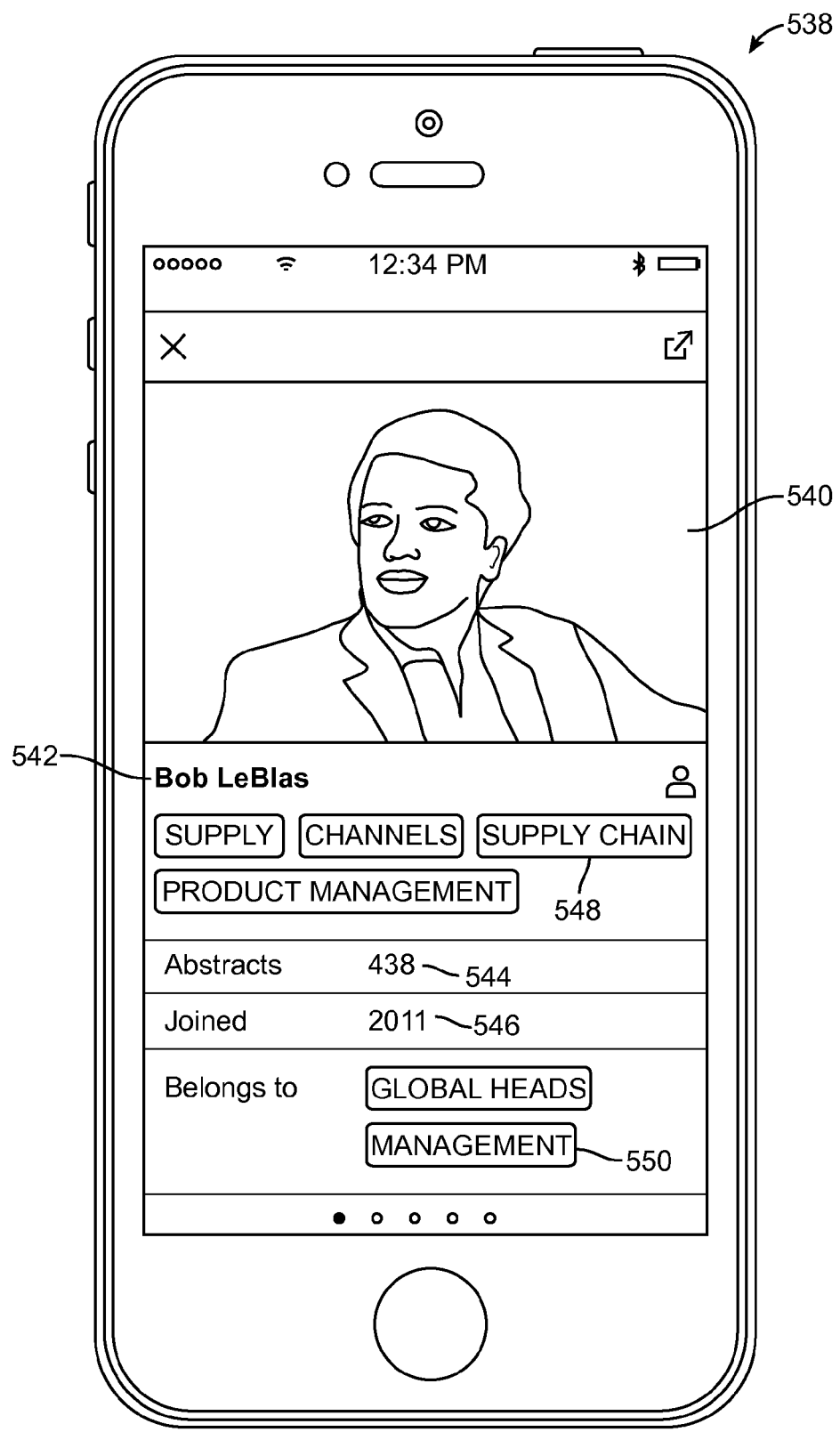
FIG. 5F shows an illustrative example of a front face for a visually representable abstract representing an individual human entity in accordance with at least one embodiment.

FIG. 5F illustrates an exemplary front face 538 for a visually representable abstract representing an individual human entity. The front face 538 may display, for instance, a profile picture 540 of the individual, the individual's name 542, the number of abstracts authored by the individual 544, and the date the individual joined the organization 546. The front face 538 may also display one or more tags 548 associated with the individual, as well as groups7 or other affiliations 550 of the individual, both of which may provide indications regarding the expertise of the individual.

In addition to serving as a presentation layer for source data, the abstracts described herein may also be actionable to support various functionalities related to data and information management. For example, the abstracts generated by the data discovery platform may be used to mediate interactions between one or more users (e.g., clients, employees of an enterprise) and the data sources. The abstracts may include links or other access points to the associated source data, and the data discovery platform may enable such abstracts to be used as a medium through which access to the associated data may be controlled (e.g., by controlling user access roles and permissions to the abstract itself). The data discovery platform may provide context for how the source data can be operated on by various platforms (e.g., third party applications, processing platforms), and may provide links (or other access methods) to such platforms. In some embodiments, the data discovery platform may enable representative sharing of the underlying data with unaffiliated users (e.g., unaffiliated with the source data, and/or data provider) through the abstracts, such as via the sharing or exchanging of the abstracts, which may occur via suitable channels such as via web link, email, texts, social media, and the like. Such unaffiliated users may have limited access to the data or details within the shared access, as may be determined and/or customized by the abstract, data creator, IT administrator, and/or system administrator.

As another example, the data discovery platform may enable abstracts to be used as an arbiter of communication with the data provider, creator, owner, expert, or any other entity or contact associated with a given abstract. Such communication may be initiated to, for example, request access to the source data, ask the contact/creator questions about other data holdings and/or abstracts, or discuss potential data-related products and services. Accordingly, abstracts may provide contact information for such associated entities, include facilities for communicating with the entities, or be integrated with preexisting communication modalities implemented by other applications (e.g., emails, texts, social media, etc.).

In some embodiments, the data discovery platform may employ data metering in order to monitor overall system usage, such as by users (e.g., employees, clients, extrinsic users), data providers (e.g., enterprises), data creators, system administrators, and the like. As used herein, the term "data metering" may also refer to API metering, application usage metering, and the like. In some embodiments, such data metering may be used for billing purposes in order to determine the overall value of the data discovery platform to a customer (e.g., user, data provider, data creator, system administrator, etc.). Alternatively or in combination, data metering may be useful to data providers or system administrators in order to provide an assessment of the usage of the data holdings and generated abstracts. Data metering techniques may involve the insertion of monitoring points or nodes at any suitable location within the system topologies described herein, such as at the data sources, indexing engines, data discovery platforms, storage systems, third party applications, or the connections between any of the above (e.g., APIs and API endpoints between these components). The data metering may involve collecting suitable metrics related to the data assets exposed to and/or passing through the monitoring points. Such metrics may be based on: the amount of connected data (e.g., size and/or number of data assets), the amount of abstracts created from the data (e.g., size and/or number of abstracts created), the amount of data abstracted by the indexing engines and/or data discovery platform in the process of abstract generation, the number of abstracts retrieved from the data discovery platform (e.g., in the process of abstract search, tagging, dissemination, tracking, etc.), the number of searches performed on existing abstracts, the number of notifications or alerts set by a user, and the like. For example, an indexing engine (e.g., the data connector 406) may include a monitoring node, such that statistics related to the data processed by the indexing engine during abstract generation are provided to the data discovery platform for data metering. As another example, a monitoring node may be incorporated in an API connecting an third party application to the data discovery platform, thus enabling metering based on the amount of abstracts generated from data pushed to the platform via the third party application.

In some embodiments, the abstracts may support tags and tagging-related functionalities. For example, the abstracts may have one or more textual tags associated therewith. Tags may be specific to a given knowledge domain, workspace, enterprise domain, and the like. Tags and other domain-specific information indexed by abstracts may be used to enable topic-specific searching by a searching entity. Tags, and collections (taxonomies or "libraries") thereof, may be generated and associated with specific technical sub-domains, and visualized in the context of the abstracts and search results so as to enable users to infer an abstract's source data, as well as quickly locate and discover data relevant to the search. Tags may be generated in a variety of manners. For example, tags may be generated by users (e.g., data creators, searching entities, etc.), either individually or in batches. In some embodiments, the creation of user-generated tags may be aided by providing references and auto-completion facilities to the tag creator (e.g., by dynamically displaying relevant tags within the existing library of available tags.) In other examples, the tags may be generated by an indexing engine or components thereof (e.g., the data connector 406 or the people connector 408) or other intermediary entity (e.g., the publisher 410) during the process of data abstraction, based on their own internal tagging algorithms. As yet another example, an implementing data discovery platform may automatically apply tags to given abstracts using inference algorithms as it determines are applicable. The system-inferred tagging mechanism may include a machine learning facility that enables the mechanism to improve over time for individual users as well as domains, since the creation, use patterns, and modifications thereof create metadata regarding the inferred meaning of tags and their associations. Such a mechanism may be used to dynamically and/or automatically expand (or suggest expansion to) domain-specific libraries. As yet another example, extrinsic users may programmatically provide pre-existing or predetermined tags (or a library of such tags), as well as programmatically request and pull the tags currently extant on the implementing system. It is contemplated that tags may be generated in any appropriate fashion, such as by the use of noun extraction techniques (e.g., upon metadata), data extrapolation, sentiment analysis, or other predictive techniques, or the use of a predetermined taxonomy (or, in the case of implementation within a known enterprise, a preexisting taxonomy), the use of which may be aided by a thesaurus or similar reference that may be, for example, specific to the domain or taxonomy.

In some embodiments, tagging may be implemented as a way to organize abstracts. For example, one or more tags may be used to define a collection of abstracts, such that any abstract labeled with some or all of these tags are considered to be a member of the collection. Accordingly, an abstract may be automatically added to the collection by tagging with the appropriate tag(s). Conversely, an abstract may be automatically removed from the collection by removing the corresponding tag(s). Such tag-based collections may be implemented in conjunction with suitable functionalities (e.g., tag-based searching and/or filtering) in order to facilitate data discovery and navigation.

Furthermore, the data discovery platform may also enable a collection of representative abstracts to be used as a searchable index of the underlying data (as well as of the abstracts). The abstracts and/or the underlying data may be searchable based on abstract content, tags, context, groups, associations, or any other relevant parameters. For example, the search functionalities may be integrated with the abstract tagging system described herein, such that the tags are indexed for search by the data discovery platform during the tag generation process, thereby enabling the collection of abstracts to be searched using on their associated tags. These and any other search capabilities may be implemented through an end user application (e.g., a local or web application), the data discovery platform, an indexing engine interfacing between the data sources and the data discovery platform (e.g., through the data connectors 406 or the people connectors 408 using their own previously generated search indices, as described elsewhere herein), or suitable combinations thereof.

Furthermore, the search results may be presented in any suitable format or context, based on user preference. For example, when a search is executed against a collection of representative abstracts, the search results may be displayed as previews or visual representations of the relevant representative abstracts returned. The search results may include titles, tags, thumbnail images, and other metadata or relevant data values used to generate the abstracts. In other embodiments, the search result is represented in multiple visualized modalities (and in some of such embodiments, the modalities visualized may change dynamically based on the nature of the search, the user requesting the search, the context of the search display, etc.). For example, such modalities may include geographic maps, timelines, conceptual maps and tag clouds generated from and/or associated with metadata in the abstracts responsive to the search request. The modalities shown are modular and may be customized by an administrator of the search system, the data and/or abstract creator, the user entity performing the search, and other entities. Such modalities may maintain a dynamic relationship with a conventional search result view (e.g., a conventional list sorted hierarchically by relevance.)

The searchable index itself may include a machine learning facility. Such a machine learning facility may be implemented in order to improve the relevance and quality of search results, such as based on previously executed user searches, action behaviors, existing tag associations, and other search-relevant parameters. For example, the searchable index may cross-reference users, data providers, abstract creators, or other entities associated with popular tags. As another example, the searchable index may use DOI registration/tracking of a given subset of abstracts to improve the quality, relevance, and discovery of those abstracts when returned as search results. As a specific example, DOI relationships may be used to introduce other data sources, users, and web pages (e.g. on the Internet) into search results against abstracts when the system determines such extrinsic sources would be relevant to the search conducted.

In some examples, the data discovery platform may be employed to monitor data assets, and may generate representative abstracts as a methodology for communicating to an appropriate entity (e.g., data provider, data creator, data owner, user, etc.) that an event (e.g., a data-associated event or a user-associated event) has occurred. The monitored data assets may include any data assets that are exposed in any way to the data discovery platform, such as data assets provided and/or generated at any point in the abstract creation process. As an example, with respect to the embodiments of FIG. 4, the monitored data may include the heterogeneous data sources 402, the human data sources 404, ancillary data derived from the data sources by the data connectors 406, human profile data generated by the people connectors 408, converted data produced by the publisher 410, abstracts generated by the abstract creation system 412, user data provided through a local user application 414, or suitable combinations thereof.

The monitoring functions may be performed by any components and/or entities of or related to the data discovery platform (e.g., the indexing engines 405, publisher 408, abstract creation system 412, local user application 414, web application 416), the data provider, or the users. In some embodiments, a component or entity may monitor data during the process of acting upon the data (e.g., receiving, transmitting, processing, analyzing, displaying, etc.). Alternatively or in addition, the component may monitor all data exposed to the component, at any point in time and in any manner (e.g., all data located in associated data stores and data sources). Such monitoring activities may occur without requiring external intervention from another entity, such as in the case of automatic monitoring activities performed at predetermined time intervals (e.g., periodic automated polling of source data). Conversely, a user, data provider, or system administrator, etc. may actively initiate data monitoring (e.g., by specifying when such monitoring activities should occur, instructing the data discovery platform to perform a check on currently held data assets).

An event may be any occurrence associated with any subset of the monitored data described above. Such events may include occurrences related to: user activity, such as user requests to access or obtain more information regarding the monitored data, or generate abstracts based on the monitored data; data provider activity, such as addition, removal, or modification of data sources or data assets; system administrator activity, such as changes in data permissions and accessibility; or activities performed by any other relevant entity. As another example, a user (or data provider, indexing engine, third party application, or any other suitable entity) may specify one or more predetermined data-associated criteria (e.g., "set an alert"), and the fulfillment of the predetermined criteria may constitute an event (e.g., "triggering the alert"). In some embodiments, one or more predetermined criteria may be determined by a machine learning facility, such as the embodiments described herein in the context of abstract tagging and search. The predetermined criteria may pertain to any aspect of the monitored data, such as a state of the monitored data. The state may be a state of the content of the data or a state of the data itself. For example, a predetermined criterion may include: detecting whether the monitored data has been modified, accessed, cited, shared, tagged, or searched; determining whether certain data values appear in the monitored data at a specified location, frequency, rate, etc. (e.g., certain keywords appearing at a higher than expected frequency, a certain subject trending on a news feed or in social media); determining whether the content of the monitored data indicates that a certain outcome has occurred (e.g., data values indicative of a desired result being achieved, data values indicative of a malfunction or other abnormal state); detecting whether an association of the monitored data has changed (e.g., a user forming, joining, or leaving an organization, data assets being moved from one database to another); or any other relevant occurrences as well as suitable combinations thereof.

As mentioned above, the predetermined criteria may be specified by a user, data provider, data creator, data owner, system administrator, or any other entity associated with the monitored data. In some embodiments, a notification (e.g., an alert) may be provided by the data discovery platform to one or more of the above entities in response to an occurrence of the event. Alternatively or in combination, the notified entity may be the same as the specifying entity, or a different entity than the specifying entity (e.g., an employer may set an alert that, when triggered, notifies an employee). The notification may be transmitted to the user in any suitable manner (e.g., based on previously indicated preferences of the user), such as via email, texts, social media, news feeds (e.g., a feed detailing abstract-related activity as described below) and the like.

In some embodiments, the data discovery platform may generate an abstract representative of the event, the details of a such a process being provided elsewhere herein, and the abstract may be included in (e.g., embedded within), linked from, or otherwise accessible from the notification. The event abstract may include information enabling the user to achieve a sufficiently comprehensive understanding of the event by reviewing the abstract, such as: information regarding time and/or location of the event; data sources, data assets, or human entities associated with the event; a textual description summarizing the event; images, videos, or other graphics of the event; metrics, statistics or analytics representative of the event; or any other relevant information.

In some embodiments, the data discovery platform may infer, via preexisting relationship information determined for the monitored data during the abstract generation process, other data sources or assets associated with the monitored data that may also be relevant to the event, and include access modalities (e.g., links) to the other data sources or assets (or abstracts representative thereof) in the event abstract, thereby facilitating user access to these potentially relevant resources. For example, in response to an event indicating a malfunction in a sensor platform, the data discovery platform may generate an abstract providing not only sensor data indicative of the malfunction, but also providing links to instruction manuals, directory information for a technical expert or the sensor platform owner, and other such assets, or abstracts representative of these assets.

Figure 6A:
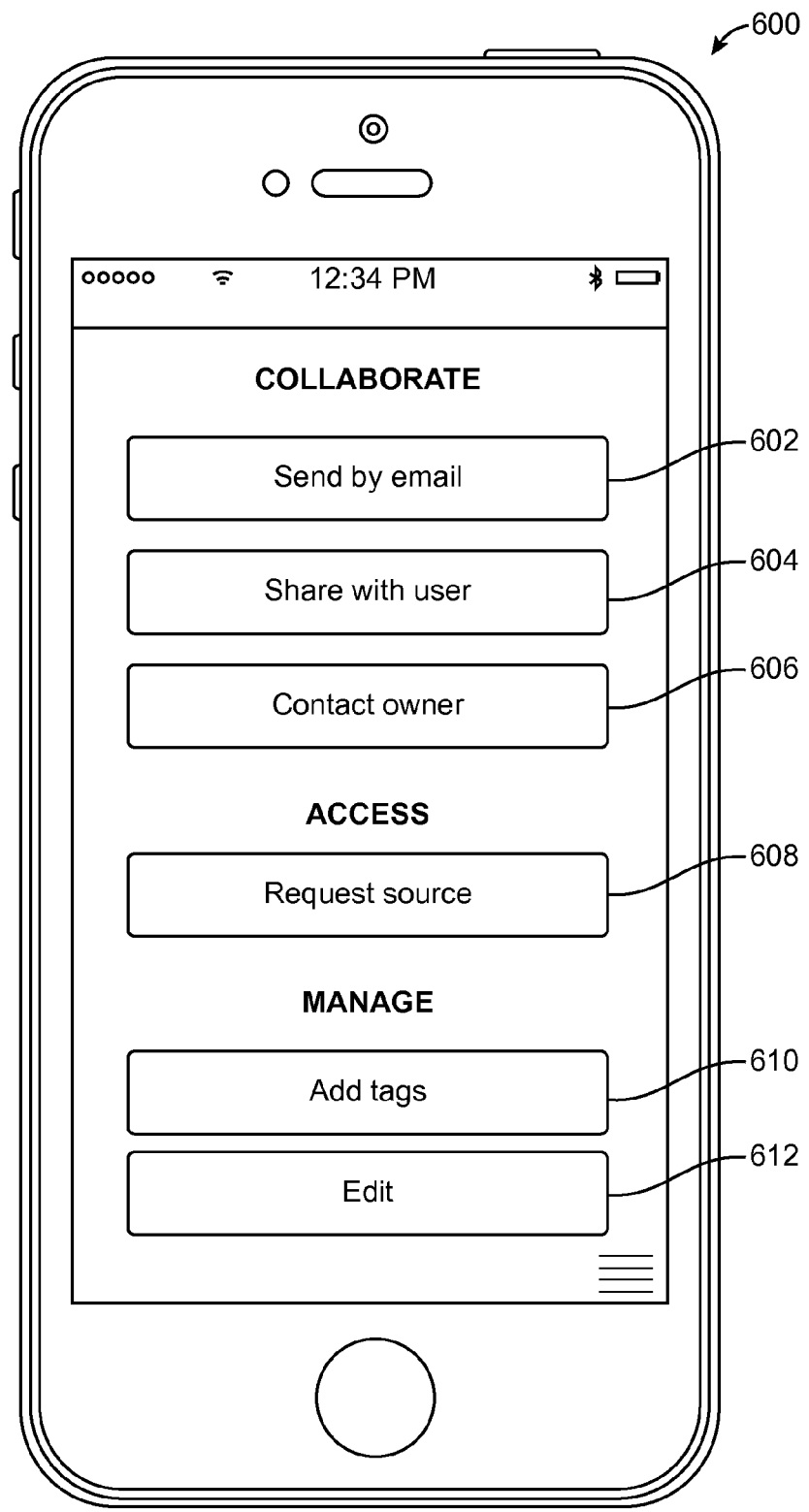
FIG. 6A shows an illustrative example of an abstract management UI in accordance with at least one embodiment.

FIG. 6A illustrates an exemplary abstract management UI 600 enabling users to perform at least some of the abstract-associated functionalities described herein. The UI 600 may enable a user to disseminate an abstract, for example, by sending it via email (or other suitable data transmission methods) 602 or sharing with other users 604. The UI 600 may also enable the user to contact the owner of the abstract 606 (e.g., the abstract creator, data owner, data creator, or data provider). The user may also transmit a request to access the source data associated with the abstract 608. In some embodiments, the UI 600 may include functionalities allowing the user to add tags 610 to the abstract, as well as edit the content of the abstract or underlying data 612.

Figure 6B:
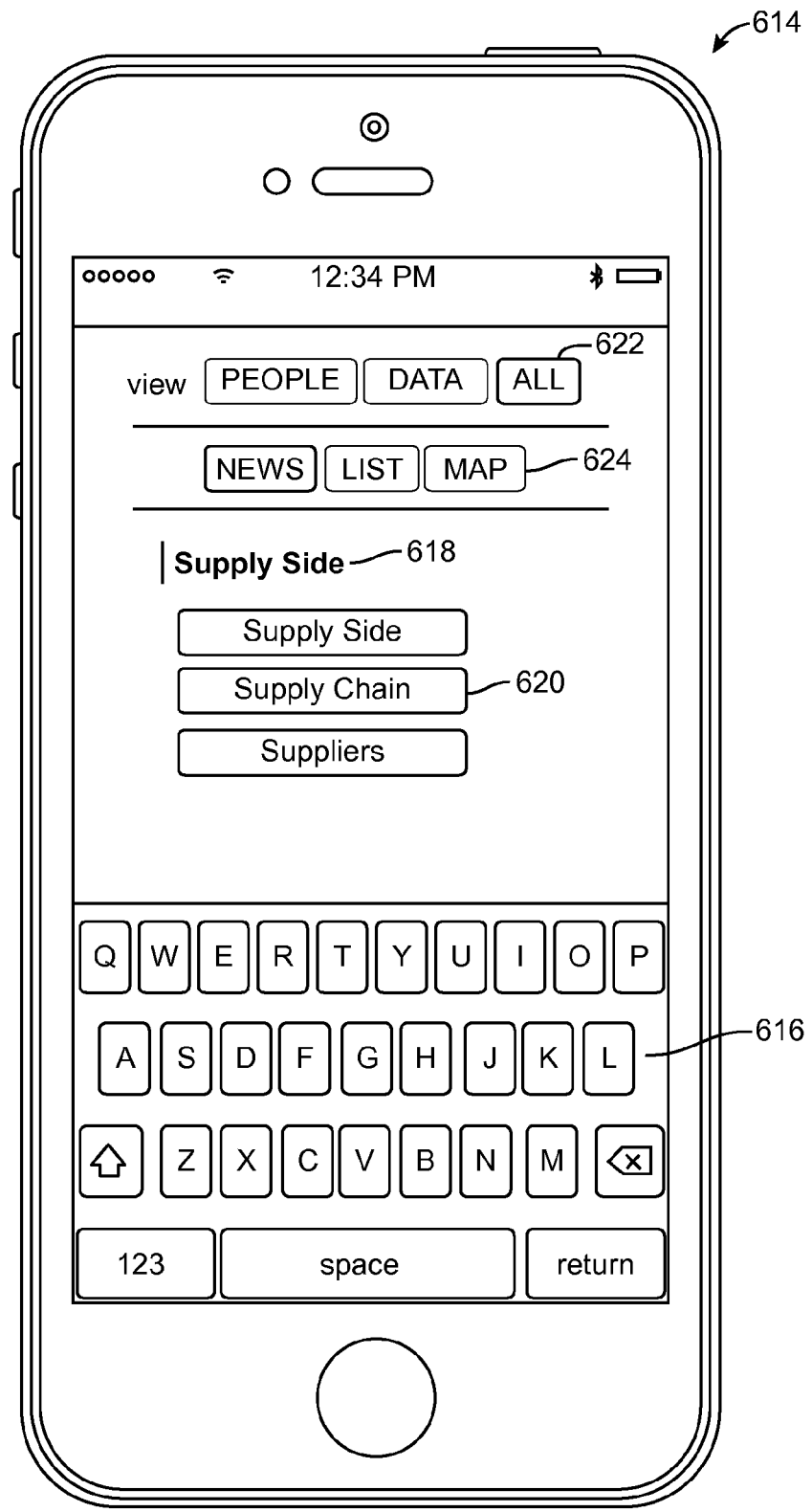
FIG. 6B shows an illustrative example of an abstract search request UI for searching abstracts in accordance with at least one embodiment.

FIG. 6B illustrates an exemplary abstract search request UI 614 for searching abstracts. The UI 614 may include a modality for receiving user input (e.g., a virtual keyboard 616), which may be used to input search strings 618. In some embodiments, the application underlying the UI 614 may include auto-complete functionality for search strings (e.g., based on tags, content, etc. found in existing abstracts), such that the UI 614 may display one or more suggested search terms 620 to facilitate the user search process. Furthermore, the UI 614 may enable the user to perform searches within various categories 622 (e.g., abstracts representing human entities, abstracts representing data assets, or all abstracts), as well as specify a suitable format and/or context for presenting the search results 624 (e.g., as a news feed, list, map, etc.).

Figure 6C:
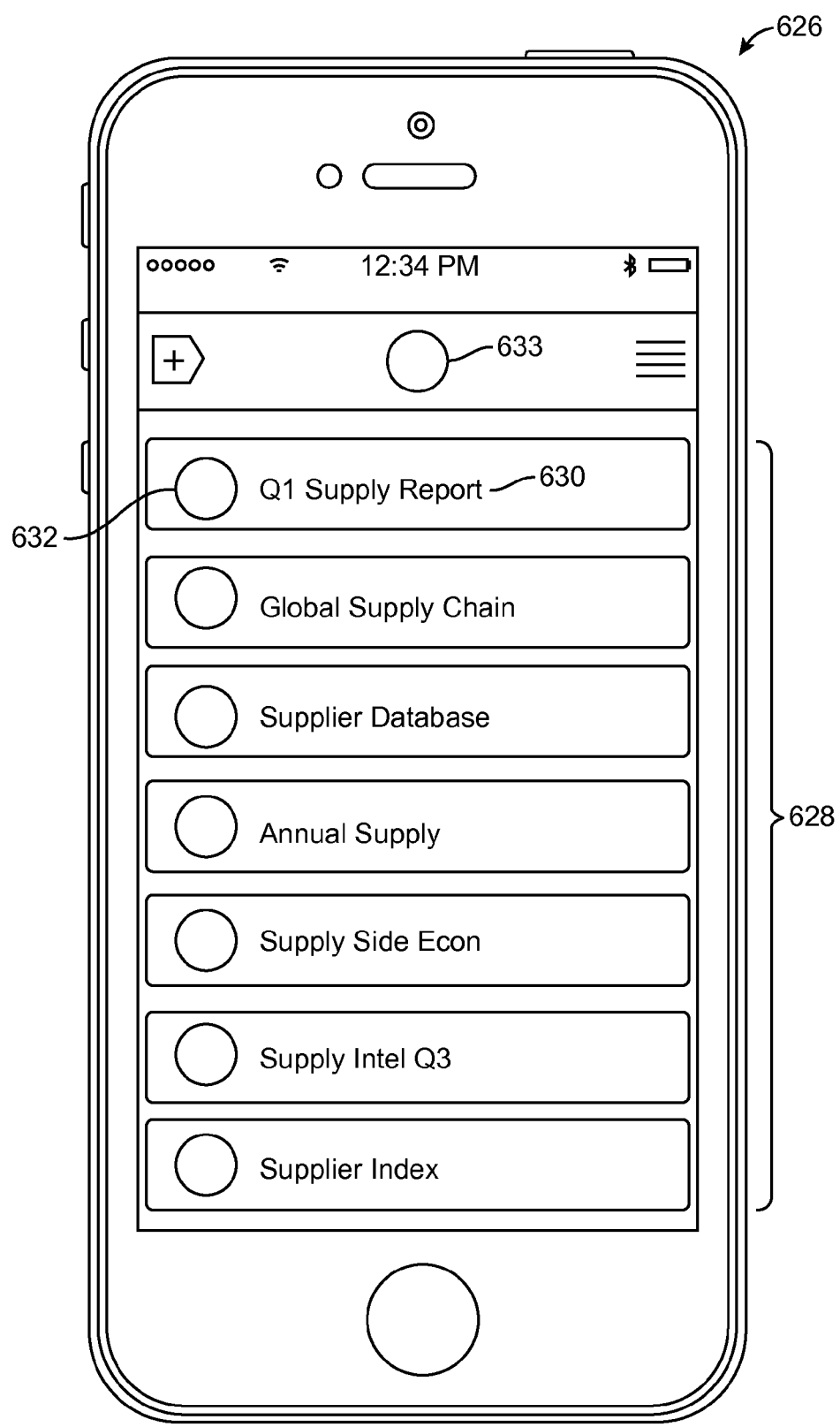
FIG. 6C shows an illustrative example of an abstract search result UI for displaying search results in accordance with at least one embodiment.

FIG. 6C illustrates an exemplary abstract search result UI 626 for displaying search results. Although the search results are depicted in FIG. 6C as a list of abstracts 628, other formats and/or contexts are also possible, as previously mentioned. For each returned abstract, the UI 626 may display the abstract title 630, as well as a thumbnail image 632 representative of the abstract. The user may use the UI 626 to select one or more of the listed abstracts for further actions (e.g., viewing, tagging, emailing, sharing, etc.).

In some embodiments, the UI 626 may also include a navigation icon 633, which may be implemented as a visually distinctive graphical element such as a logo or other branding element. Selection of the navigation icon 633 by a user (e.g., through tapping, clicking, or other suitable forms of user input), may enable the user to access data discovery functionalities (e.g., navigation, search, and/or filtering functionalities) for the collection of existing abstracts. For example, the navigation icon 633 may be a link or other access modality to the search request UI 614 of FIG. 6B, such that the user may quickly deploy the search request UI 614 by selecting the navigation icon 633.

Figure 6D:
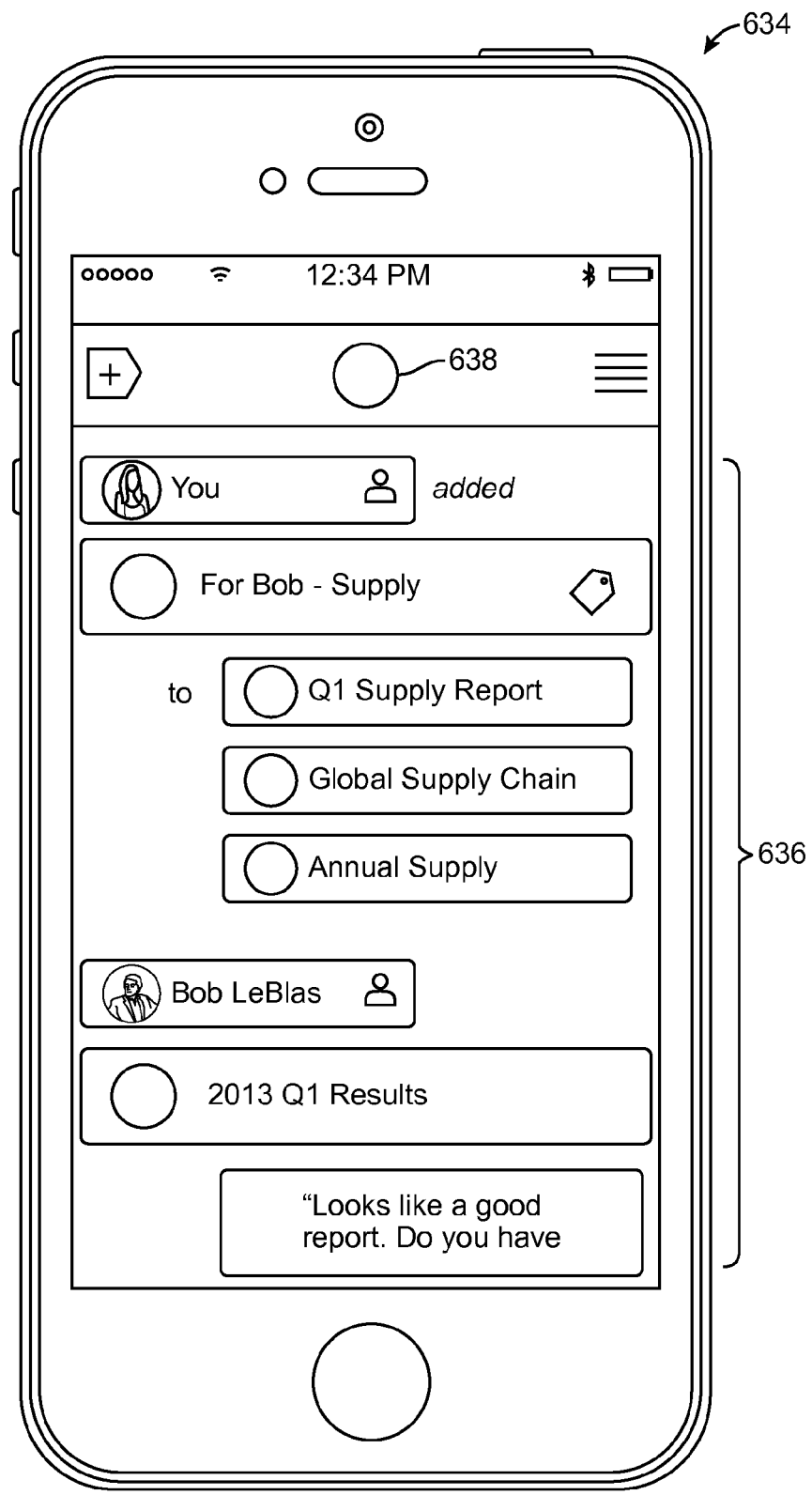
FIG. 6D shows an illustrative example of an abstract activity feed UI for monitoring abstract-related activities in accordance with at least one embodiment.

FIG. 6D illustrates an exemplary abstract activity feed UI 634 for monitoring abstract-related activities. The UI 634 may display a chronological feed 636 of the user's most recent activities, such as communications with other users, abstract management (e.g., creating, viewing, tagging, searching, editing, sharing, etc.), automatic event notifications, and the like. Additionally, the feed 636 may include information regarding the activity of other users related to the present user (e.g., users in the same groups as the present user, users that the present user has communicated with, users whose activity the present user is following). The feed 636 may include interactive links to abstracts displayed in the feed for quick viewing. Furthermore, the feed 636 may be integrated with email, social media, or other communication modalities, as elected by the user, so that the user may be notified when new content is added to the feed 636. The UI 634 may also include a navigation icon 638 similar to the navigation icon 633 of FIG. 6C and enabling rapid user access to data discovery tools as described above.

Figure 7:
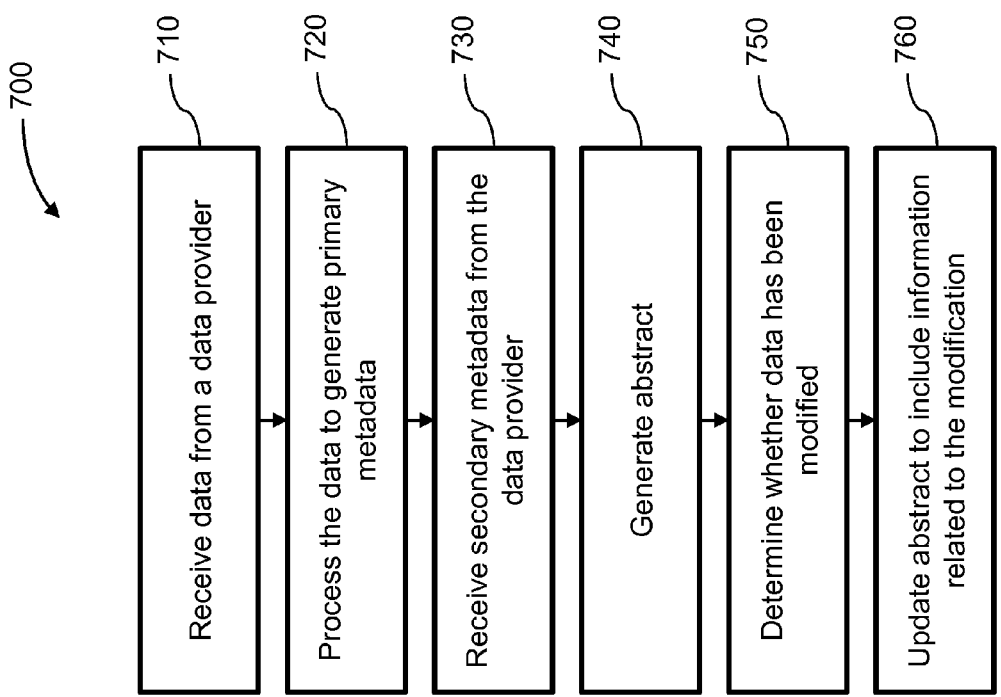
FIG. 7 shows an illustrative example of a process for generating abstracts in accordance with at least one embodiment.

FIG. 7 illustrates an example process 700 for generating abstracts. Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. It is contemplated that the steps of process 700, as with any and all processes described herein, are not necessarily interdependent or performed in a particular order, except as explicitly stated.

Data, which may be of any form or type, may be received from a data provider 710. The data provider may be similar to the exemplary data providers described in relation to at least FIGS. 1-4, and may include, for example, a third party application associated with a suitable API for interfacing with a data discovery platform. The data may be processed to generate a set of primary metadata (or any other ancillary data sets derived from the data) 720, and such primary metadata may be associated with contexts that relate to the content of the data. The processing may be performed by a data discovery platform, such as the systems 102, 202, or 303 of FIGS. 1-3, in a manner disclosed elsewhere herein. A set of secondary metadata (or any other type of ancillary data) may be received from the data provider 730. Based on the primary and secondary metadata, an abstract can be generated (e.g., by the data discovery platform) 740, in a fashion previously described. The abstract may include at least some of the primary and secondary metadata, as well as the contexts of the primary metadata (e.g., displayed as faces of a visually representable abstract having the contexts). Optionally, following the generation of the abstract, a determination may be made as to whether the underlying data has been modified 750 by the data discovery platform. In an additional optional step, the generated abstract can be updated as necessary to include information related to or reflective of the modification 760.

Figure 8:
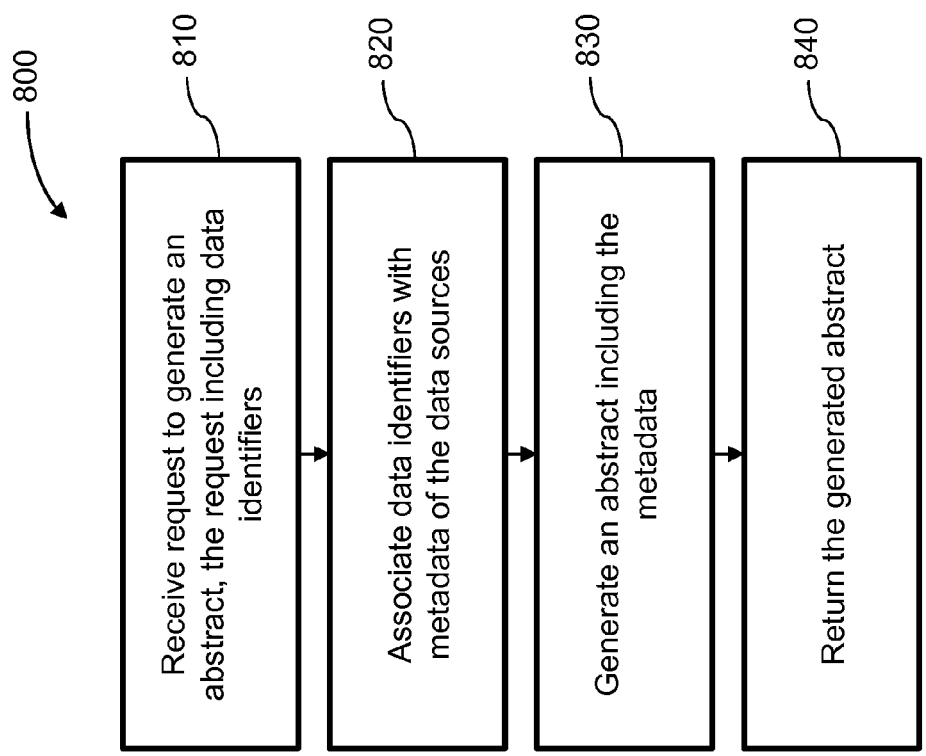
FIG. 8 shows another illustrative example of a process for generating abstracts in accordance with at least one embodiment.

FIG. 8 illustrates another example process 800 for generating abstracts. A request may be received (e.g., from a user, data provider, etc.) to generate an abstract, and such a request may include data identifiers of certain data sources 810. Such data sources may be similar to the heterogeneous data sources previously described in relation to at least FIGS. 3 and 4. The data identifiers may be associated with metadata (or other ancillary data) of the data sources 820 by a data discovery platform, such as in the manner described with respect to at least FIG. 1. Based on the metadata, an representative abstract of the data sources may be generated using one or more of the techniques previously described herein, the abstract including at least some of the metadata 830. The generated abstract may be returned the requestor 840 in any suitable manner, such by displaying the abstract to the request by a suitable web application or local application, such as those described in connection to at least FIG. 4.

Figure 9:
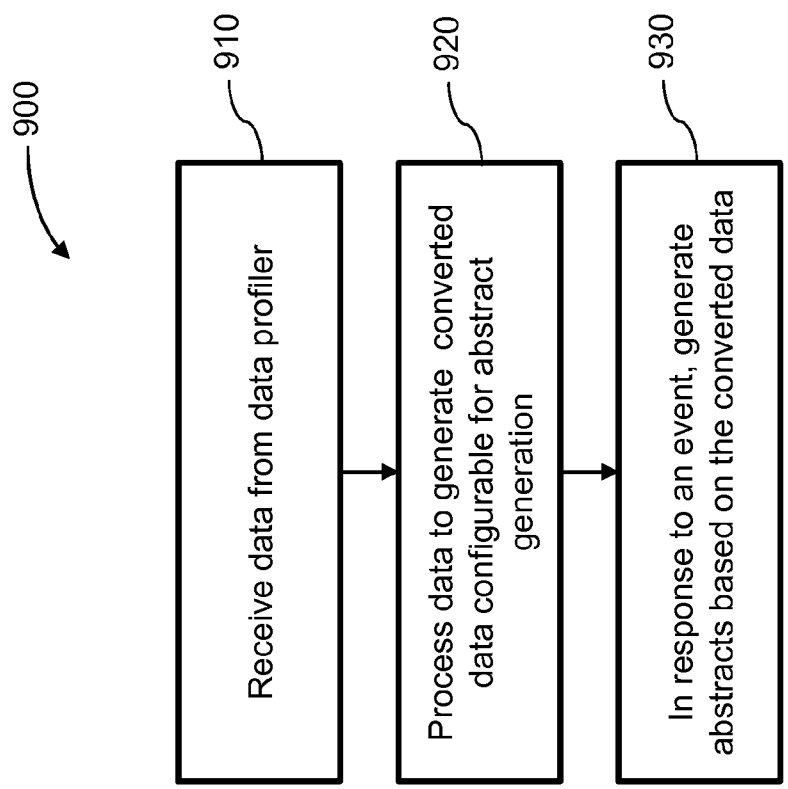
FIG. 9 shows yet another illustrative example of a process for generating abstracts in accordance with at least one embodiment.

FIG. 9 illustrates yet another example process 900 for generating abstracts. Data, such as data derived from heterogeneous data sources as previously described herein, may be received from a data profiler 910. The data profiler 910 may be an indexing engine or a component of an indexing engine, such as those described in relation to at least FIGS. 3 and 4. For example, the data may be received by a publisher 410 from one or more indexing engines 405. The data may be processed (e.g., by the publisher 410) to generate converted data configurable for generating abstracts 920 such as visually representable abstracts, using the techniques disclosed elsewhere herein. In some embodiments, the converted data sets may include relationship information representative of associations between some of the data sources. In response to an occurrence of an event, abstracts may be generated (e.g., by a data discovery platform, such as the systems 102, 202, or 303 of FIGS. 1-3) based on the converted data 930. The resultant abstracts may include links or other methods enabling the underlying data sources to be accessed by an authorized user. Exemplary events have been previously described herein and may be associated with at least the data sources, the data, and/or the converted data. For example, an event may include a request from a user entity to generate and/or access the abstract based on the data extracted from the data sources.

Figure 10:
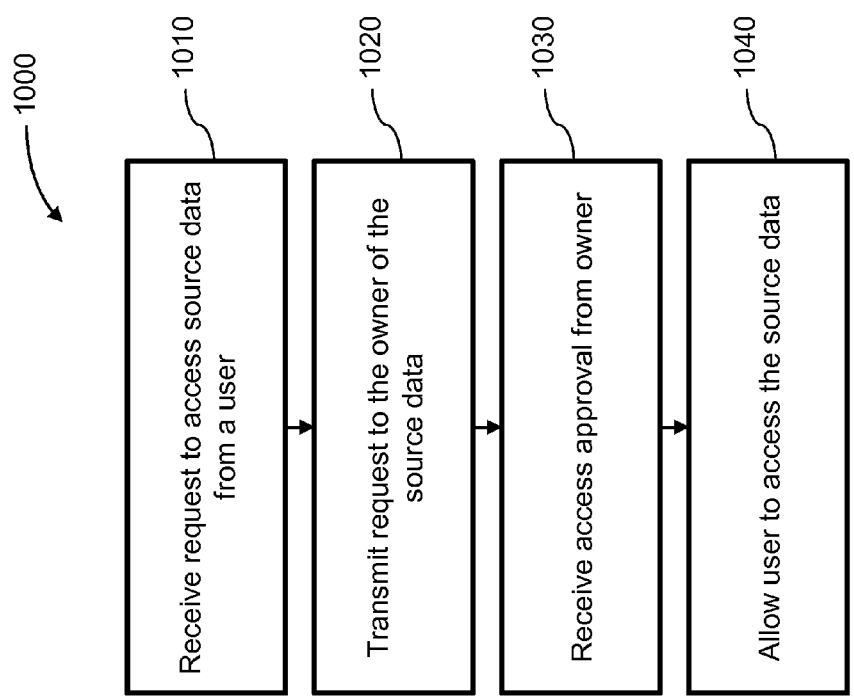
FIG. 10 shows an illustrative example of a process for enabling a user to access source data in accordance with at least one embodiment.

FIG. 10 illustrates an example process 1000 for enabling a user to access source data. A data discovery platform may receive a request to access source data from a user 1010 (e.g., a user entity viewing an abstract). The request may be provided via a suitable UI for displaying an abstract associated with the source data, such as a UI previously described herein with respect to at least FIG. 6A. The system may transmit the request to the owner of the source data 1020, which may be a data creator, data provider, abstract creator, etc. The transmission may utilize any suitable communication methods as elected by the data owner, such as email, social media, texts, or an abstract activity feed as described in relation to at least FIG. 6C. Optionally, if the owner approves the request, the approval may be transmitted to and received by the data discovery platform 1030, using the same communication methods described above. The data discovery platform may then allow the user to access the source data 1040, such as by altering the permissions of the user and/or source data accordingly, or coordinating with a system administrator or data provider to achieve the same. Alternatively, the data discovery platform may enable access simply by providing the user with a link (or other access modality) to the source data, without overriding and/or altering the existing permissions infrastructure.

Figure 11:
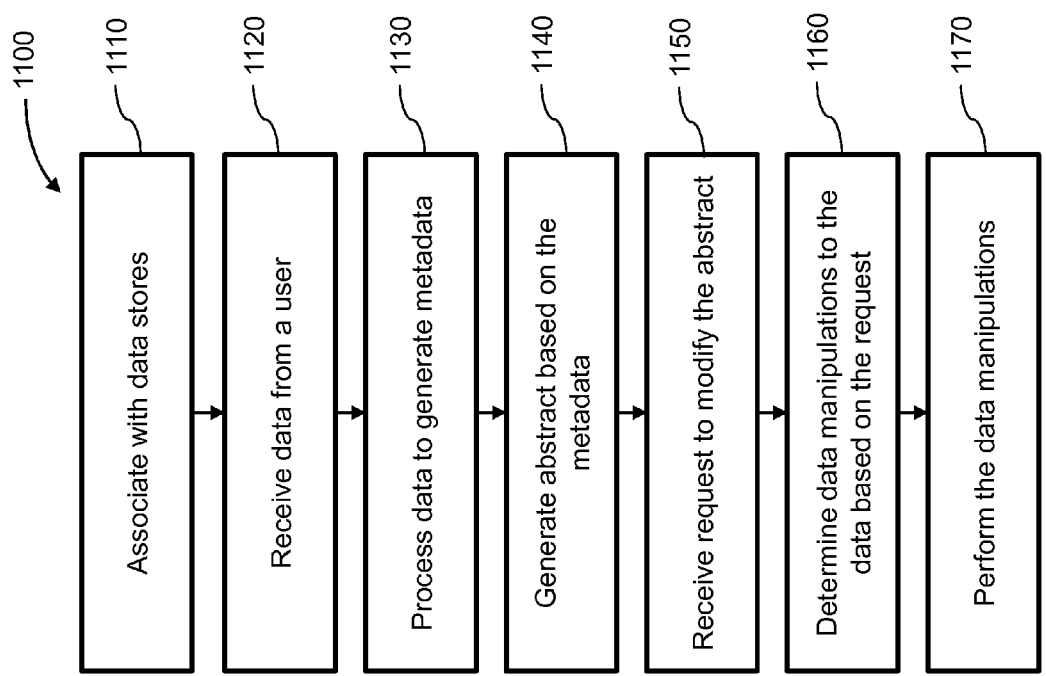
FIG. 11 shows an illustrative example of a process for modifying an abstract in accordance with at least one embodiment.

FIG. 11 illustrates an example process 1100 for modifying an abstract. A data discovery platform (e.g., systems 102, 202, or 303) may be associated with (e.g., connected to) data stores used for storing data 1110. Data for generating an abstract may be received from a user 1120, similar to the techniques described herein with respect to at least FIGS. 1-3. Such data may be processed to generate metadata (or other ancillary data derived from the data) 1130, and an abstract may be generated based on the metadata (or other ancillary data) 1140 using the approaches previously disclosed herein. The data discovery platform may receive a request to modify the abstract 1150, such as from the abstract creator, another user, the data provider, or any other entity authorized to request such modifications, and such a request may provided via a UI such as the UI 600 of FIG. 6A. Based on the request, the data manipulations to be performed on the source data may be determined 1160 and performed 1170, by the data discovery platform or by another entity (e.g., local software application) as directed by the data discovery platform. In some embodiments, such data manipulations may be performed on manifestations of the source data so as to leave the underlying source data unmodified.

Figure 12:
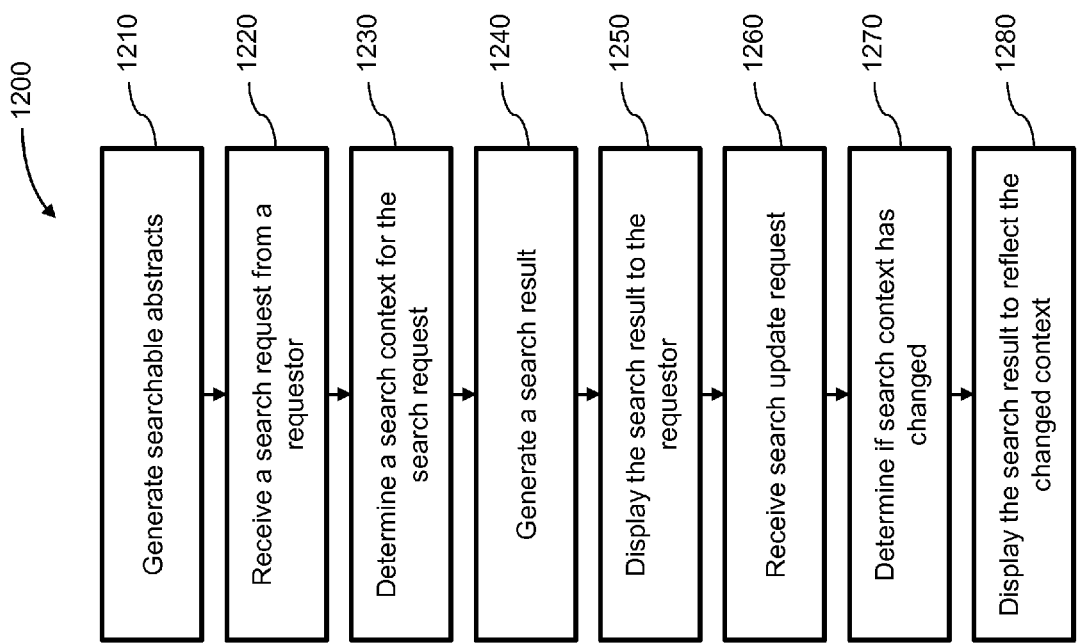
FIG. 12 shows an illustrative example of a process for searching abstracts in accordance with at least one embodiment.

FIG. 12 illustrates an example process 1200 for searching abstracts. A plurality of searchable abstracts may be generated 1210, using any of the techniques described herein, such that the searchable abstracts include searchable metadata (or other ancillary data) For example, such abstracts may include one or more tags (such as the tags described with respect to at least FIGS. 5A and 5F), and such tags may be indexed for search by the data discovery platform at the time of abstract generation. The data discovery platform may receive a search request from a requestor (e.g., a user) 1220, via a suitable search request UI such as the UI 614 of FIG. 6B. A search context may be determined for the search request 1230, and may be a requestor-selected search context as depicted in FIG. 6B. A search of the abstracts may be performed to generate a search result 1240 using one or more of the techniques disclosed herein. The search result may be displayed to the requestor 1250 based on the provided search context using an appropriate UI (e.g., the UI 626 of FIG. 6C). Optionally, an search update request may be provided 1260 in which the requestor updates one or more parameters of the search. For instance, the requestor may input a new search string or select a new context for the search via the UI 614. Based on the search update request, the data discovery platform may determine whether the search context has changed relative to the previous search request 1270. If the context has changed, the search result may be displayed in a manner reflecting the changed search context 1280 (e.g., switching from displaying results in a list format to displaying results on a map, etc.).

Figure 13:
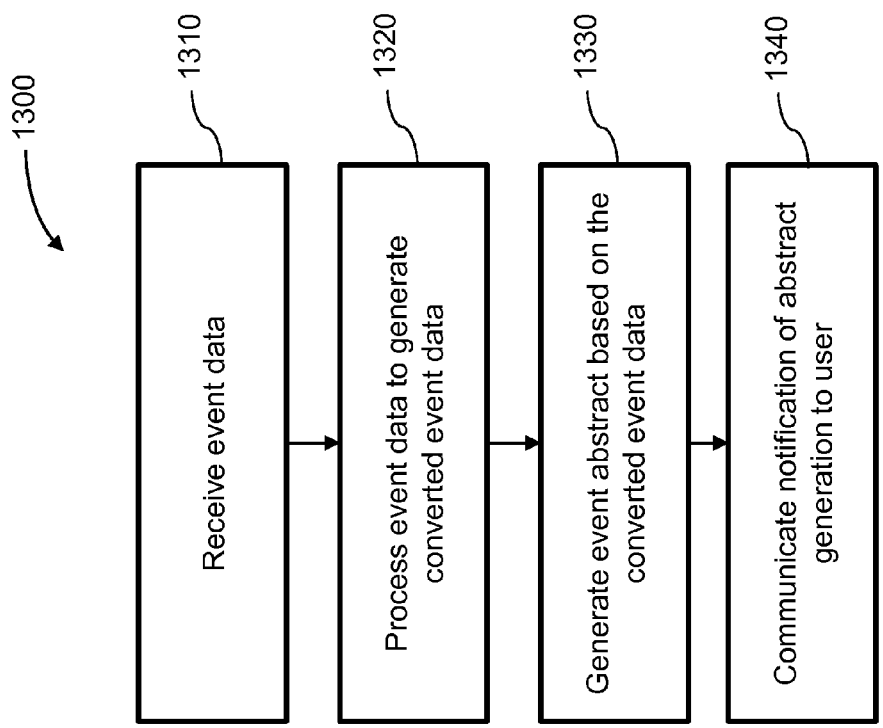
FIG. 13 shows an illustrative example of a process for responding to data-associated events in accordance with at least one embodiment.

FIG. 13 illustrates an example process 1300 for responding to data-associated events. Event data representative of an event may be received 1310, such as by a data discovery platform described in relation to at least FIGS. 1-4. As previously described herein, the event may be associated with monitored data, which may include any data exposed to the data discovery platform. The event data may be generated by an monitoring entity (e.g., an indexing engine, data provider, data source, one or more components of the data discovery platform, etc.) configured to survey the data for the occurrence of such an event. In some embodiments, the monitoring entity may specifically be configured to respond to such an occurrence by providing event data (e.g., to the data discovery platform) representative of one or more aspects of the event. For example, the event data may include: information regarding the time and/or location of the event; data assets and/or sources related to or otherwise relevant to the event, such as data having content descriptive of one or more aspects of the event, as well as abstracts representative of such data assets and/or sources; information relating to any entities (e.g., users, data sources, data providers, data creators, etc.) associated with the event, as well as abstracts representative of such entities; and any other event-associated information. As another example, the event data may include ancillary data derived from the monitored data, such as metadata of the monitored data. The event data may be processed (e.g., by a publisher 410) to generate converted event data suitable for generating abstracts such as visually representable abstracts 1320. Based on the converted event data, an event abstract representative of the event may be generated 1330 by the data discovery platform, using one or more techniques previously described herein. A notification of abstract generation may be communicated to a user 1340, or to any other entity previously requesting notification of such an event. Such notifications may be delivered in any suitable manner and may include links (or any other access modality) to the event abstract and/or abstracts representative of the monitored data, as disclosed elsewhere herein.

The various techniques described herein may be partially or fully implemented using code that is storable upon storage media and computer readable media, and executable by one or more processors of a computer system. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, solid state drives (SSD) or other solid state storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for batch-generating information abstracts to provide a unified framework for managing data assets from a plurality of different software applications, the method performed under the control of one or more computer systems configured with executable instructions, the method comprising:

receiving from a user, in a programmatic manner, one or more requests to connect to the plurality of different software applications executing remotely from the one or more computer systems, each of the plurality of different software applications associated with one or more respective data assets;

for each respective data asset of each of the plurality of different software applications:
      obtaining respective metadata associated with the respective data asset from a respective intermediary application designed to communicate with the respective software application; and
      storing the respective metadata in a data storage system remote from the plurality of different software applications and adding the respective metadata to a searchable index, the stored respective metadata providing a respective information abstract summarizing the respective data asset;

determining that a modified data asset has been modified;
   sending to the user an event notification indicating that the modified data asset was modified, the event notification operable to update a chronological feed displayed on a user device, the chronological feed providing a chronological view of activities related to the respective data assets of the plurality of different software applications;

receiving from the user a selection of an interactive link from the chronological feed, the interactive link associated with a first data asset of a first software application of the plurality of different software applications;

identifying a second data asset associated with the first data asset, the second data asset associated with a second software application of the plurality of different software applications; and sending to the user a first visually-representable information abstract of the first data asset in response to the selection of the interactive link, the first visually-representable information abstract comprising:
      the respective metadata associated with the first data asset; and
      an access modality enabling the user to access a second visually-representable information abstract corresponding to the second data asset.

2. The method of claim 1, wherein obtaining the respective metadata comprises programmatically extracting the respective metadata using an application programming interface.

3. The method of claim 2, wherein
   the respective metadata is compliant with a predetermined metadata format.

4. The method of claim 1, wherein the one or more requests are received over a network from a software application resident on a device separate from the one or more computer systems.

5. The method of claim 1, wherein the respective metadata includes a variable amount of data, the variable amount based on a permission level of the user.

6. The method of claim 1, further comprising
   updating the respective metadata of the modified data asset in the data storage system in response to the determination that the data asset has been modified.

7. The method of claim 1, further comprising:
   programmatically receiving a search request;
   searching the searchable index based on the search request so as to generate a search result comprising the respective metadata of one or more respective data assets of the plurality of different software applications; and
   programmatically returning the search result.

8. The method of claim 7, further comprising:
   associating one or more predefined tags with the respective information abstract of a respective data asset; and
   adding the one or more predefined tags to the searchable index such that the respective information abstract of the respective data asset is searchable based on the one or more predefined tags.

9. The method of claim 8, wherein the one or more predefined tags are specified by the user.

10. The method of claim 8, further comprising automatically selecting the one or more predefined tags, wherein the one or more predefined tags define a collection of information abstracts.

11. The method of claim 1, wherein the first visually-representable information abstract further comprises a communication modality enabling the user to communicate with an entity associated with the first data asset.

12. The method of claim 1, wherein:
   the first data asset is stored on a user data storage system separate from the one or more computer systems; and
   the user is a user of the user data storage system.

13. The method of claim 1, wherein obtaining the respective metadata comprises:

receiving ancillary data associated with the respective data asset from the respective intermediary application; and generating the respective metadata by converting the respective ancillary data to a standard format.

14. The method of claim 1, wherein the first visually-representable information abstract further comprises an access modality enabling the user to access the first data asset.

15. The method of claim 1, wherein
the plurality of different software applications comprises at least one cloud storage system and at least one social media platform.

16. One or more non-transitory computer-readable storage media having collectively stored thereon executable instructions that, when executed by one or more processors of a computing resource provider's computer system, cause the computer system to at least:

process programmatically one or more requests from a user to connect to a plurality of different software applications executing remotely from the one or more computer systems, each of the plurality of different software applications associated with one or more respective data assets;

for each respective data asset of each of the plurality of different software applications:
obtain respective metadata associated with the respective data asset from a respective intermediary application designed to communicate with the respective software application; and
store the respective metadata in a data storage system remote from the plurality of different software applications and adding the respective metadata to a searchable index, the stored respective metadata providing a respective information abstract of the respective data asset;

determine that a modified data asset has been modified;

send to the user an event notification indicating that the modified data asset was modified, the event notification operable to update a chronological feed displayed on a user device, the chronological feed providing a chronological view of activities related to the respective data assets of the plurality of different software applications;

receive from the user a selection of an interactive link from the chronological feed, the interactive link associated with a first data asset of a first software application of the plurality of different software applications;

identify a second data asset associated with the first data asset, the second data asset associated with a second software application of the plurality of different software applications; and send to the user a first visually-representable information abstract of the first data asset in response to the selection of the interactive link, the first information abstract comprising:
the respective metadata associated with the first data asset; and
an access modality enabling the user to access a second visually-representable information abstract corresponding to the second data asset.

17. The one or more non-transitory computer readable storage media of claim 16, wherein the executable instructions further cause the computer system to:
programmatically receive a search request;
search the searchable index based on the search request so as to generate a search result comprising the respective metadata of one or more respective data assets of the plurality of different software applications; and
programmatically return the search result.

18. The one or more non-transitory computer readable storage media of claim 16, wherein the executable instructions further cause the computer system to:
automatically select one or more predefined tags to associate with the respective information abstract of a respective data asset;
associate the one or more predefined tags with the respective information abstract of a respective data asset, wherein the one or more predefined tags define a collection of information abstracts; and
add the one or more predefined tags to the searchable index such that the respective information abstract of the respective data asset is searchable based on the one or more predefined tags.

19. The one or more non-transitory computer readable storage media of claim 16, wherein obtaining the respective metadata comprises:
receiving ancillary data associated with the respective data asset from the respective intermediary application; and
generating the respective metadata by converting the ancillary data to a standard format.

20. A data abstraction system for batch-generating information abstracts to provide a unified framework for managing data assets from a plurality of different software applications, the system comprising:
one or more processors; and
one or more non-transitory computer-readable media having stored collectively thereon instructions executable by the one or more processors to cause the data abstraction system to at least:
process programmatically one or more requests from a user to connect to a plurality of different software applications executing remotely from the one or more computer systems, each of the plurality of different software applications associated with one or more respective data assets;
for each respective data asset of each of the plurality of different software applications:
obtain respective metadata associated with the respective data asset from a respective intermediary application designed to communicate with the respective software application; and
store the respective metadata in a data storage system remote from the plurality of different software applications and adding the respective metadata to a searchable index, the stored respective metadata providing a respective information abstract of the respective data asset;
determine that a modified data asset has been modified;
send to the user an event notification indicating that the modified data asset was modified, the event notification operable to update a chronological feed displayed on a user device, the chronological feed providing a chronological view of activities related to the respective data assets of the plurality of different software applications;
receive from the user a selection of an interactive link from the chronological feed, the interactive link associated with a first data asset of a first software application of the plurality of different software applications;
identify a second data asset associated with the first data asset, the second data asset associated with a second software application of the plurality of different software applications; and send to the user a first visually-representable information abstract of the first data asset in response to the selection of the interactive link, the first information abstract comprising:
  the respective metadata associated with the first data asset; and
  an access modality enabling the user to access a second visually-representable information abstract corresponding to the second data asset.

21. The data abstraction system of claim 20, wherein the instructions further cause the data abstraction system to:
  programmatically receive a search request;
  search the searchable index based on the search request so as to generate a search result comprising the respective metadata of one or more data assets; and
  programmatically return the search result.

22. The data abstraction system of claim 21, wherein the instructions further cause the data abstraction system to:
  associate one or more predefined tags with the respective information abstract of a respective data asset; and
  add the one or more predefined tags to the searchable index such that the respective information abstract of the respective data asset is searchable based on the one or more predefined tags.

23. The data abstraction system of claim 22, wherein the instructions further cause the data abstraction system to automatically select the one or more predefined tags, wherein the one or more predefined tags define a collection of information abstracts.

24. The data abstraction system of claim 20, wherein obtaining the respective metadata comprises:
  receiving ancillary data associated with the respective data asset from the respective intermediary application; and
  generating the respective metadata by converting the ancillary data to a standard format.

25. The data abstraction system of claim 20, wherein the first visually-representable information abstract further comprises a communication modality enabling the user to communicate with an entity associated with the first data asset.

26. A computer-implemented method for generating information abstracts performed under the control of one or more computer systems configured with executable instructions, the method comprising:
  receiving from a user, in a programmatic manner, one or more requests to connect to the plurality of different software applications executing remotely from the one or more computer systems, each of the plurality of different software applications associated with one or more respective data assets;
  for each respective data asset of each of the plurality of different software applications:
    obtaining respective metadata associated with the respective data asset from a respective intermediary application designed to communicate with the respective software application;
    selecting one or more predefined tags associated with the respective data asset, the one or more predefined tags defining a collection of information abstracts; and
    storing the respective metadata and the selected one or more predefined tags in a data storage system remote from the plurality of different software applications and adding the respective metadata and the selected one or more predefined tags to a searchable index, the stored respective metadata providing a respective information abstract of the respective data asset;
  determining that a modified data asset has been modified;
  sending to the user an event notification indicating that the modified data asset was modified, the event notification operable to update a chronological feed displayed on a user device, the chronological feed providing a chronological view of activities related to the respective data assets of the plurality of different software applications;
  receiving from the user a selection of an interactive link from the chronological feed, the interactive link associated with a first data asset of a first software application of the plurality of different software applications
  identifying a second data asset associated with the first data asset, the second data asset associated with a second software application of the plurality of different software applications;
  sending to the user a first visually-representable information abstract of the first data asset in response to the selection of the interactive link, the first visually-representable information abstract comprising:
    the respective metadata associated with the first data asset; and
    an access modality enabling the user to access a second visually-representable information abstract corresponding to the second data asset;
  programmatically receiving a search request;
  searching the searchable index based on the search request so as to generate a search result comprising the respective metadata of one or more data assets; and
  programmatically returning the search result.

* * * * *